(12) United States Patent
Zhang et al.

(10) Patent No.: US 10,978,957 B2
(45) Date of Patent: Apr. 13, 2021

(54) RESONANT CONVERTER CIRCUIT AND RESONANT CONVERTER CIRCUIT CONTROL METHOD

(71) Applicant: HUAWEI TECHNOLOGIES CO., LTD., Shenzhen (CN)

(72) Inventors: Yanzhong Zhang, Shanghai (CN); Zheng Ma, Xi'an (CN); Boning Huang, Dongguan (CN); Grover Victor Torrico-Bascopé, Kista (SE); Dianbo Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/904,735

(22) Filed: Jun. 18, 2020

(65) Prior Publication Data

US 2020/0321878 A1 Oct. 8, 2020

Related U.S. Application Data

(63) Continuation of application No. PCT/CN2018/122306, filed on Dec. 20, 2018.

(30) Foreign Application Priority Data

Dec. 22, 2017 (CN) .......................... 201711407832.5

(51) Int. Cl.
*H02M 3/335* (2006.01)
*H02M 3/337* (2006.01)
(Continued)

(52) U.S. Cl.
CPC ......... *H02M 3/33569* (2013.01); *H02M 1/08* (2013.01); *H02M 7/483* (2013.01);
(Continued)

(58) Field of Classification Search
CPC . H02M 3/337; H02M 3/3376; H02M 3/33507
(Continued)

(56) References Cited

U.S. PATENT DOCUMENTS 9,231,488 B2 * 1/2016 Zhu ........................ H02M 3/337
9,281,753 B2 3/2016 Reddy
(Continued)

FOREIGN PATENT DOCUMENTS

CN 101609970 A 12/2009
CN 101728961 A 6/2010
(Continued)

OTHER PUBLICATIONS

Soeiro Thiago B., et al: "Three-phase five-level active-neutral-point clamped converters for medium voltage applications", Oct. 27, 2013 (Oct. 27, 2013), pp. 85-91, XP032585682.

*Primary Examiner* — Gary A Nash
(74) *Attorney, Agent, or Firm* — Rimon PC

(57) ABSTRACT

A resonant converter circuit comprises a multi-level inverter circuit placed before a resonant unit, and the multi-level inverter circuit can reduce a voltage to be input to the resonant unit. The reduced input voltage of the resonant unit results in a drop in an output voltage of the entire resonant converter circuit. In this process, the final output voltage is adjusted by adjusting the input voltage of the resonant unit, with no need to substantially adjust a switching frequency of the resonant converter circuit.

15 Claims, 20 Drawing Sheets

(51) Int. Cl.
*H02M 1/08* (2006.01)
*H02M 7/483* (2007.01)
*H02M 1/00* (2006.01)

(52) U.S. Cl.
CPC .......... *H02M 3/337* (2013.01); *H02M 3/3376* (2013.01); *H02M 3/33507* (2013.01); *H02M 2001/0054* (2013.01)

(58) Field of Classification Search
USPC ........................ 363/21.02, 21.03, 78, 97, 98
See application file for complete search history.

(56) References Cited

U.S. PATENT DOCUMENTS

| | | |
|---|---|---|
| 2009/0316443 A1 | 12/2009 | Coccia et al. |
| 2013/0301314 A1 | 11/2013 | Fu et al. |
| 2013/0314948 A1* | 11/2013 | Perreault ............. H02M 7/4807 363/8 |
| 2014/0111016 A1 | 4/2014 | He et al. |
| 2014/0198536 A1* | 7/2014 | Fu .................... H02M 3/33546 363/17 |
| 2015/0180350 A1* | 6/2015 | Huang ................. H02J 7/0068 307/66 |
| 2016/0043659 A1 | 2/2016 | Xu et al. |

FOREIGN PATENT DOCUMENTS

| | | |
|---|---|---|
| CN | 101771351 A | 7/2010 |
| CN | 201541200 U | 8/2010 |
| CN | 102545638 A | 7/2012 |
| CN | 102624266 A | 8/2012 |
| CN | 202424533 U | 9/2012 |
| CN | 102857103 A | 1/2013 |
| CN | 105337521 A | 2/2016 |
| CN | 108258909 A | 7/2018 |
| CN | 108566094 A | 9/2018 |
| JP | 2015027169 A | 2/2015 |

\* cited by examiner (E/2, −E/2)

RESONANT CONVERTER CIRCUIT AND RESONANT CONVERTER CIRCUIT CONTROL METHOD

CROSS-REFERENCE TO RELATED APPLICATIONS

This application is a continuation of International Application No. PCT/CN2018/122306, filed on Dec. 20, 2018, which claims priority to Chinese Patent Application No. 201711407832.5, filed on Dec. 22, 2017. The disclosures of the aforementioned applications are hereby incorporated by reference in their entireties.

TECHNICAL FIELD

The present application relates to the field of switch-mode power supply technologies, and in particular, to a resonant converter circuit and a resonant converter circuit control method.

BACKGROUND

LLC resonant converters are widely used in DC-DC converters. The LLC resonant converter is a resonant circuit that adjusts an output voltage by controlling a switching frequency (frequency regulation).

FIG. 1 is a schematic circuit diagram of a conventional LLC resonant converter, including a switching network, an LLC resonant unit, a resonant transformer, and a rectifier network. The LLC resonant unit includes a resonant inductor Lr, a resonant capacitor Cr, where Lr may be a physical inductor device or leakage inductance of a transformer, and an Lm that may be a physical inductor device or an excitation inductance of a transformer. A switching frequency of the switching network is controlled to regulate an output voltage. An advantage of the LLC resonant converter is implementation of Zero Voltage Switch (ZVS) for a primary-side switching transistor and Zero Current Switch (ZCS) for a secondary-side rectifier diode. By using a soft switch technology, a switching loss can be reduced, thereby improving conversion efficiency and power density.

FIG. 2 shows output voltage gain curves of a conventional LLC resonant converter. The horizontal axis denotes working frequencies, and the vertical axis denotes output voltage gains of the LLC resonant converter. In FIG. 2, different curves represent output voltage gain curves corresponding to different load ratios of the LLC resonant converter. According to the gain curves, a working frequency of the LLC resonant converter is much higher than its resonant frequency in a case of a relatively low output voltage gain. In this case, a switching loss of a primary-side switching transistor increases greatly, and zero current switch is impossible for a secondary-side rectifier diode. Therefore, a switching loss of the LLC resonant convert increases greatly, resulting in a significant drop in conversion efficiency of the LLC resonant converter, and further resulting in a drop in load capacity of the LLC resonant converter.

SUMMARY

In view of the foregoing content, a resonant converter circuit and a resonant converter circuit control method in the present application are proposed, so that conversion efficiency of a resonant converter circuit does not drop in the case of a low-gain output of the resonant converter circuit.

According to a first aspect, this application provides a resonant converter circuit, which is applied to a three-phase circuit. The resonant converter circuit includes three multi-level inverter circuits, three resonant units, a three-phase transformer, a three-phase rectifier circuit, an output filter circuit, and a controller. Input terminals of the three multi-level inverter circuits are connected in parallel to two ends of an input power supply; input terminals of the three resonant units are connected to output terminals of the three multi-level inverter circuits respectively in a one-to-one mode, where the resonant units are configured to perform voltage conversion on square wave voltage signals; three primary-side windings of the three-phase transformer are connected to output terminals of the three resonant units respectively in a one-to-one mode, where the three-phase transformer is configured to perform voltage conversion on voltage signals output by the three resonant units; input terminals of the three-phase rectifier circuit are connected to secondary-side windings of the three-phase transformer respectively in a one-to-one mode, where the three-phase rectifier circuit is configured to rectify a voltage signal output by the transformer; an input terminal of the output filter circuit is connected to output terminals of the three-phase rectifier circuit, where the output filter circuit is configured to perform wave filtering on a voltage signal output by the three-phase rectifier circuit, to obtain an output voltage of the resonant converter circuit; and the controller is configured to, when a required output voltage is less than a preset voltage, control switching statuses of switching transistors in the multi-level inverter circuit to reduce an amplitude of a square wave voltage signal output by the multi-level inverter circuit, so that the resonant converter circuit operates within a preset range of a resonant frequency.

The resonant converter circuit provided in this embodiment adjusts the final output voltage by adjusting input voltages of the resonant units, with no need to substantially adjust a switching frequency of the resonant converter circuit. Therefore, when the output voltage is relatively low, the resonant converter circuit can still work near its resonant frequency, thereby reducing a semiconductor switching loss under low-voltage output, and improving conversion efficiency and load capacity of the resonant converter circuit under low-voltage output.

In an implementation of the first aspect, the multi-level inverter circuit is a three-level converter circuit or a five-level converter circuit.

In an implementation of the first aspect, the three-level converter circuit includes a bleeder circuit and a first three-level bridge arm. The bleeder circuit includes a first capacitor and a second capacitor, where the first capacitor and the second capacitor are connected in series to the two ends of the input power supply, a connection point between the first capacitor and the second capacitor is a bleeder circuit middle point, and the bleeder circuit middle point is connected to a ground terminal; the first three-level bridge arm includes a first switching transistor, a second switching transistor, a third switching transistor, and a fourth switching transistor; the first switching transistor and the second switching transistor are connected in co-directional series and then connected in parallel to two ends of the bleeder circuit, where a connection point between the first switching transistor and the second switching transistor is a bridge arm middle point of the T-shaped three-level bridge arm, and the bridge arm middle point is connected to the input terminal of the resonant unit as the output terminal of the multi-level inverter circuit; and the third switching transistor and the fourth switching transistor are connected in reverse series and then connected between the bleeder circuit middle point and the bridge arm middle point.

In another implementation of the first aspect, the three-level converter circuit includes a bleeder circuit and a second three-level bridge arm. The bleeder circuit includes a first capacitor and a second capacitor, where the first capacitor and the second capacitor are connected in series to the two ends of the input power supply, a connection point between the first capacitor and the second capacitor is a bleeder circuit middle point, and the bleeder circuit middle point is connected to a ground terminal; the second three-level bridge arm includes a fifth switching transistor, a sixth switching transistor, a seventh switching transistor, and an eighth switching transistor that are sequentially connected in co-directional series, a first diode, and a second diode; a first terminal of the fifth switching transistor is connected to a positive terminal of the bleeder circuit, a second terminal of the eighth switching transistor is connected to a negative terminal of the bleeder circuit, and a connection point between the sixth switching transistor and the seventh switching transistor is a bridge arm middle point of the I-shaped three-level bridge arm; an anode of the first diode is connected to the bleeder circuit middle point, and a cathode of the first diode is connected to a connection point between the fifth switching transistor and the sixth switching transistor; and an anode of the second diode is connected to a connection point between the seventh switching transistor and the eighth switching transistor, and a cathode of the second diode is connected to the bleeder circuit middle point.

In still another implementation of the first aspect, the three-level converter circuit is a capacitor-clamped three-level bridge arm. The capacitor-clamped three-level bridge arm includes a ninth switching transistor, a tenth switching transistor, an eleventh switching transistor, a twelfth switching transistor, and a first clamping capacitor; the ninth switching transistor, the tenth switching transistor, the eleventh switching transistor, and the twelfth switching transistor are sequentially connected in co-directional series and then connected in parallel to the two ends of the input power supply; and a positive electrode of the first clamping capacitor is connected to a connection point between the ninth switching transistor and the tenth switching transistor, a negative electrode of the first clamping capacitor is connected to a connection point between the eleventh switching transistor and the twelfth switching transistor, and an end voltage of the first clamping capacitor is $E/2$, where $E$ is a voltage of the input power supply.

In the resonant converter circuit provided in this embodiment, the multi-level inverter circuit is implemented by capacitor-clamped multi-level bridge arms. Each multi-level bridge arm obtains electricity directly from the input power supply, with no need of an extra bleeder circuit formed by two bleeder capacitors. Therefore, for this type of resonant converter circuit, there is no voltage balance problem between bleeder capacitors, and control is easier.

In an implementation of the first aspect, that the controller is configured to, when a required output voltage is less than a preset voltage, control switching statuses of switching transistors in the multi-level inverter circuit is: when the required output voltage is less than a first preset voltage, controlling the three-level converter circuit to output a square wave voltage signal with a level difference of $E/2$, where $E$ is the voltage of the input power supply.

In another implementation of the first aspect, the five-level converter circuit includes a bleeder circuit and a first five-level bridge arm. The bleeder circuit includes a first capacitor and a second capacitor, where the first capacitor and the second capacitor are connected in series to the two ends of the input power supply, a connection point between the first capacitor and the second capacitor is a bleeder circuit middle point, and the bleeder circuit middle point is connected to a ground terminal; the first five-level bridge arm includes a second clamping capacitor, a thirteenth switching transistor, a fourteenth switching transistor, a fifteenth switching transistor, a sixteenth switching transistor, a seventeenth switching transistor, an eighteenth switching transistor, a nineteenth switching transistor, and a twentieth switching transistor; the thirteenth switching transistor, the fourteenth switching transistor, the fifteenth switching transistor, and the sixteenth switching transistor are sequentially connected in co-directional series to obtain a vertical bridge, where the vertical bridge is connected in parallel to two ends of the bleeder circuit, and a connection point between the fourteenth switching transistor and the fifteenth switching transistor is a bridge arm middle point of the five-level bridge arm; the seventeenth switching transistor and the eighteenth switching transistor are connected in reverse series to obtain a first horizontal bridge, where the first horizontal bridge bridges the bleeder circuit middle point and a connection point between the thirteenth switching transistor and the fourteenth switching transistor; the nineteenth switching transistor and the twentieth switching transistor are connected in reverse series to obtain a second horizontal bridge, where the second horizontal bridge bridges the bleeder circuit middle point and a connection point between the fifteenth switching transistor and the sixteenth switching transistor; and the second clamping capacitor spans to connect two ends of the fourteenth switching transistor and the fifteenth switching transistor, and a voltage of the second clamping capacitor is $E/4$, where $E$ is a voltage of the input power supply.

In still another implementation of the first aspect, the five-level converter circuit includes a bleeder circuit and a second five-level bridge arm. The bleeder circuit includes a first capacitor and a second capacitor, where the first capacitor and the second capacitor are connected in series to the two ends of the input power supply, a connection point between the first capacitor and the second capacitor is a bleeder circuit middle point, and the bleeder circuit middle point is connected to a ground terminal; the second five-level bridge arm includes a third clamping capacitor, a twenty-first switching transistor, a twenty-second switching transistor, a twenty-third switching transistor, a twenty-fourth switching transistor, a twenty-fifth switching transistor, a twenty-sixth switching transistor, a twenty-seventh switching transistor, and a twenty-eighth switching transistor; the twenty-first switching transistor, the twenty-second switching transistor, the twenty-third switching transistor, and the twenty-fourth switching transistor are sequentially connected in co-directional series and then connected in parallel to two ends of the bleeder circuit; the twenty-fifth switching transistor, the twenty-sixth switching transistor, the twenty-seventh switching transistor, and the twenty-eighth switching transistor are sequentially connected in co-directional series and then connected in parallel to two ends of the twenty-second switching transistor and the twenty-third switching transistor; and the third clamping capacitor bridges two ends of the twenty-sixth switching transistor and the twenty-seventh switching transistor, and a voltage of the third clamping capacitor is $E/4$, where $E$ is a voltage of the input power supply.

In yet another implementation of the first aspect, the preset voltage includes a second preset voltage, a third preset voltage, and a fourth preset voltage of which a latter one is greater than a former one, and the fourth preset voltage is less than the voltage E of the input power supply; and that the controller is configured to, when a required output voltage is less than a preset voltage, control switching statuses of switching transistors in the multi-level inverter circuit is: when the required output voltage is greater than or equal to the third preset voltage and less than the fourth preset voltage, controlling the five-level converter circuit to output a square wave voltage signal with a level difference of 3E/4; when the required output voltage is greater than or equal to the second preset voltage and less than the third preset voltage, controlling the five-level converter circuit to output a square wave voltage signal with a level difference of E/2; and when the required output voltage is less than or equal to the second preset voltage, controlling the five-level converter circuit to output a square wave voltage signal with a level difference of E/4.

In the resonant converter circuit provided in this embodiment, the multi-level inverter circuit is a five-level converter circuit. The five-level converter circuit can output four input voltages whose level differences are E, 3E/4, E/2, and E/4 respectively, to the resonant unit. The resonant converter circuit can work in different working modes respectively for four different output voltage requirements. Working mode control is more refined. This enables the resonant converter circuit to still work near its resonant frequency when an output voltage is lower, which in turn increases an output voltage range of the resonant converter circuit and its load capacity under low-voltage output.

According to a second aspect, this application provides a resonant converter circuit, which is applied to a single-phase circuit and includes a multi-level inverter circuit, a resonant unit, a transformer, a rectifier circuit, an output filter circuit, and a controller. An input terminal of the multi-level inverter circuit is connected in parallel to two ends of an input power supply, and is configured to convert a voltage of the input power supply into a square wave voltage signal, where an amplitude of the square wave voltage signal is less than or equal to an amplitude of the input power supply; an input terminal of the resonant unit is connected to an output terminal of the multi-level inverter circuit, where the resonant unit is configured to perform voltage conversion on the square wave voltage signal; a primary-side winding of the transformer is connected to an output terminal of the resonant unit, where the transformer is configured to perform voltage conversion on a voltage signal output by the resonant unit; an input terminal of the rectifier circuit is connected to a secondary-side winding of the transformer, where the rectifier circuit is configured to rectify a voltage signal output by the transformer; an input terminal of the output filter circuit is connected to an output terminal of the rectifier circuit, where the output filter circuit is configured to perform wave filtering on a voltage signal output by the rectifier circuit, to obtain an output voltage of the resonant converter circuit; and the controller is configured to, when a required output voltage is less than a preset voltage, control switching statuses of switching transistors in the multi-level inverter circuit to reduce a level difference of the square wave voltage signal output by the multi-level inverter circuit, so that the resonant converter circuit operates within a preset range of a resonant frequency.

According to a third aspect, this application further provides a resonant converter circuit system, including at least two resonant converter circuits described in the first aspect, or at least two resonant converter circuits described in the second aspect, where the at least two resonant converter circuits share one output filter circuit and one controller. Input terminals of the at least two resonant converter circuits are connected in parallel to two ends of an input power supply; and output terminals of the at least two resonant converter circuits are connected in parallel or connected in series, or some of the output terminals are connected in parallel and the rest output terminals are connected in series.

In the resonant converter circuit system provided in this embodiment, the output terminals of the at least two resonant converter circuits are, depending on a power requirement, connected in parallel, connected in series, or connected in series and then in parallel, so that output power of the entire system reaches an application requirement, thereby expanding an application scope of the resonant converter circuits.

In an implementation of the third aspect, the at least two resonant converter circuits share one bleeder circuit that is connected in parallel to the two ends of the input power supply, and the bleeder circuit includes a first capacitor and a second capacitor that are connected in series; and when the resonant converter circuit system requires only the first capacitor or the second capacitor to provide energy, the controller is configured to: control one half of the resonant converter circuits to work in a first preset mode in which the first capacitor provides energy, and control the other half of the resonant converter circuits to work in a second preset mode in which the second capacitor provides energy.

In the resonant conversion circuit system provided in this embodiment, working modes of different resonant converter circuits are controlled to achieve a voltage balance between the first capacitor and the second capacitor in the bleeder circuit, so that the entire resonant conversion circuit system works properly.

According to a fourth aspect, an embodiment provides a resonant converter circuit control method, which is applied to the resonant converter circuit described in the first aspect or the second aspect, or the resonant converter circuit system described in the third aspect. The method includes: controlling, when a required output voltage is less than a preset voltage, switching statuses of switching transistors in a multi-level inverter circuit to reduce a level difference of a square wave voltage signal output by the multi-level inverter circuit, so that the resonant converter circuit operates within a preset range of a resonant frequency.

In an implementation of the fourth aspect, the multi-level inverter circuit is a three-level converter circuit; and the controlling, when a required output voltage is less than a preset voltage, of switching statuses of switching transistors in a multi-level inverter circuit to reduce a level difference of a square wave voltage signal output by the multi-level inverter circuit includes: controlling, when the required output voltage is less than a first preset voltage, the three-level converter circuit to output a square wave voltage signal with a level difference of E/2, where E is a voltage of an input power supply; and controlling, when the required output voltage is greater than or equal to a first preset voltage, the three-level converter circuit to output a square wave voltage signal with a level difference of E.

In another implementation of the fourth aspect, the multi-level inverter circuit is a five-level converter circuit, the preset voltage includes a second preset voltage, a third preset voltage, and a fourth preset voltage of which a latter one is greater than a former one, and the fourth preset voltage is less than a voltage E of an input power supply; and the controlling of, when a required output voltage is less than a preset voltage, switching statuses of switching transistors in a multi-level inverter circuit to reduce a level difference of a square wave voltage signal output by the multi-level inverter circuit includes: controlling, when the required output voltage is greater than or equal to the fourth preset voltage, the five-level converter circuit to output a square wave voltage signal with a level difference of E; controlling, when the required output voltage is greater than or equal to the third preset voltage and less than the fourth preset voltage, the five-level converter circuit to output a square wave voltage signal with a level difference of 3E/4; controlling, when the required output voltage is greater than or equal to the second preset voltage and less than the third preset voltage, the five-level converter circuit to output a square wave voltage signal with a level difference of E/2; and controlling, when the required output voltage is less than or equal to the second preset voltage, the five-level converter circuit to output a square wave voltage signal with a level difference of E/4.

In still another implementation of the fourth aspect, there are two or more resonant converter circuits, the resonant converter circuits share one bleeder circuit that is connected in parallel to two ends of an input power supply, and the bleeder circuit includes a first capacitor and a second capacitor that are connected in series; and the controlling, when a required output voltage is less than a preset voltage, switching statuses of switching transistors in a multi-level inverter circuit to reduce a level difference of a square wave voltage signal output by the multi-level inverter circuit includes: when only the first capacitor or the second capacitor is needed to provide energy, controlling one half of the resonant converter circuits to work in a first preset mode in which only the first capacitor provides energy, and controlling the other half of the resonant converter circuits to work in a second preset mode in which only the second capacitor provides energy.

In the resonant converter circuit provided in this embodiment, the multi-level inverter circuit is placed before the resonant unit, and the multi-level inverter circuit can reduce a voltage to be input to the resonant unit. The reduced input voltage of the resonant unit results in a drop in an output voltage of the entire resonant converter circuit. In this process, the final output voltage is adjusted by adjusting the input voltage of the resonant unit, with no need to substantially adjust a switching frequency of the resonant converter circuit. Therefore, when the output voltage is relatively low, the resonant converter circuit can still work near its resonant frequency, thereby reducing a semiconductor switching loss under low-voltage output, and improving conversion efficiency and load capacity of the resonant converter circuit under low-voltage output.

DESCRIPTION OF EMBODIMENTS

For a conventional LLC resonant converter, when an output voltage gain is relatively low, its working frequency is much higher than its resonant frequency. As a result, the conversion efficiency of the LLC resonant converter is lower, and its load capacity also drops. This application provides a resonant converter circuit, where a multi-level inverter circuit is placed before a resonant unit. When a required output voltage gain is relatively low, an output voltage of the multi-level inverter circuit is decreased to reduce an input voltage that is input to the resonant unit. The reduced input voltage of the resonant unit results in a drop in an output voltage of the resonant unit, and leads to a drop in an output voltage of the entire LLC resonant converter. However, the switching frequency of the LLC resonant converter circuit is not changed substantially in this process. In other words, the LLC resonant converter circuit may still work near its resonant frequency. Therefore, the conversion efficiency and load capacity of the resonant converter are improved in the case of a low-voltage output.

Figure 1:
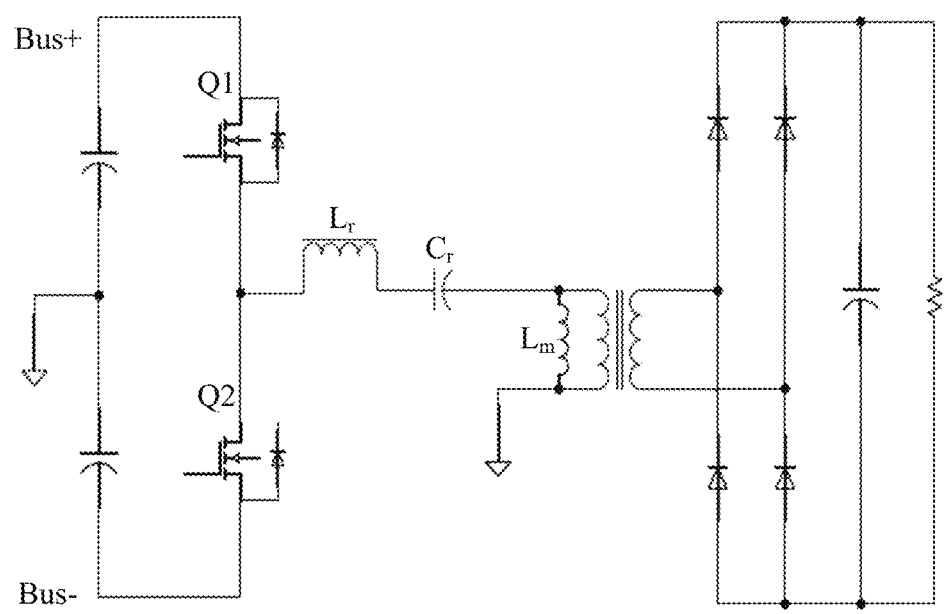
FIG. 1 is a schematic circuit diagram of a conventional LLC resonant converter.
Figure 2:
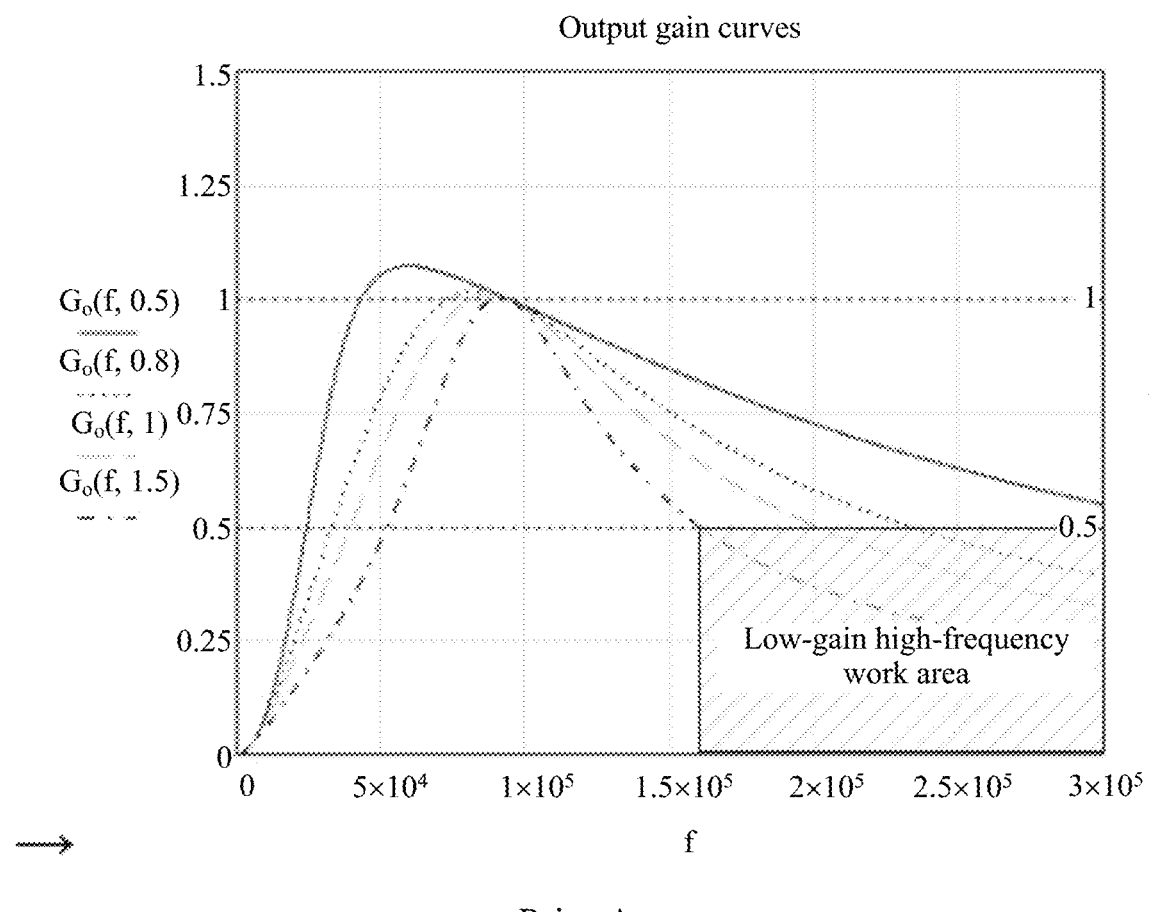
FIG. 2 is an output voltage gain curve diagram of an LLC resonant converter.
Figure 3:
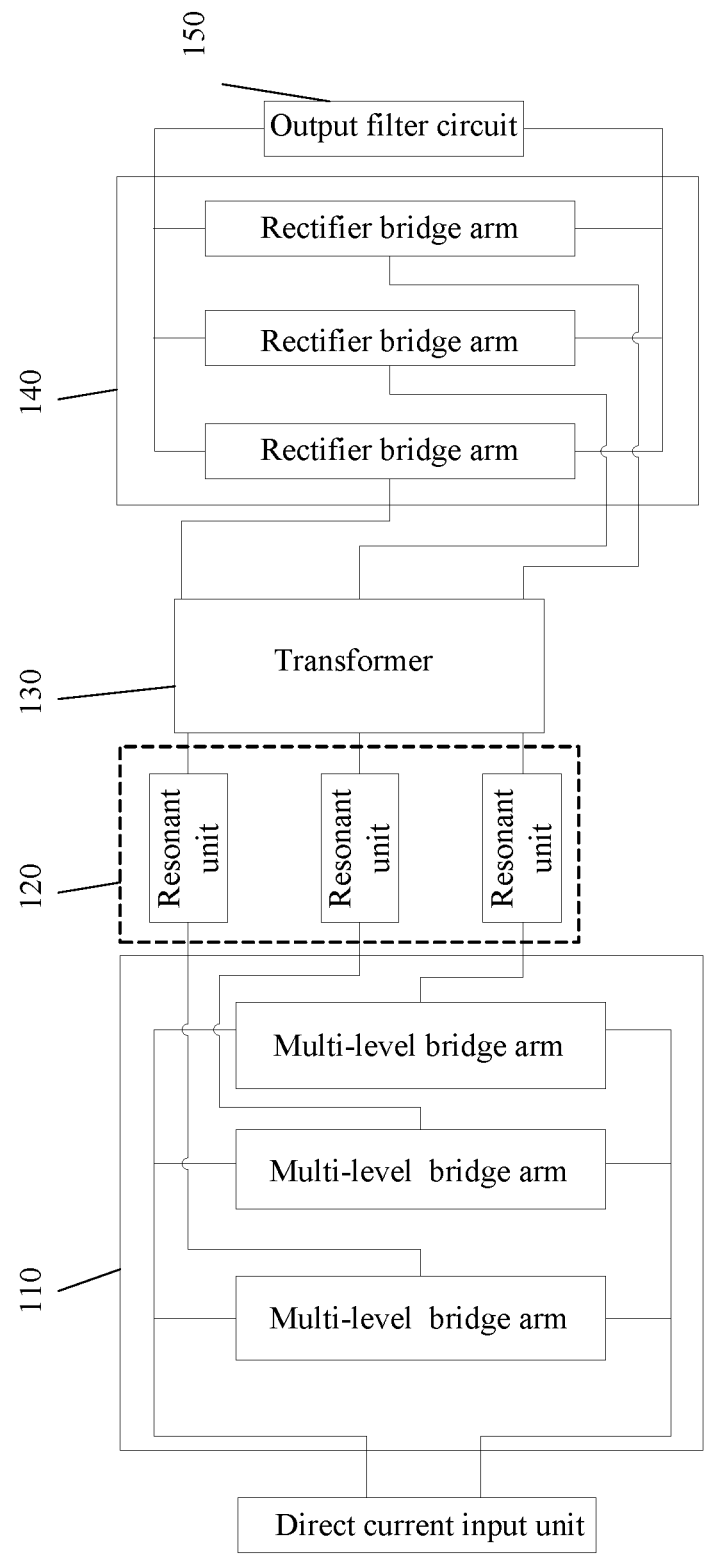
FIG. 3 is a principle block diagram of a resonant converter circuit according to an embodiment of this application.

FIG. 3 is a principle block diagram of a resonant converter circuit according to an embodiment of this application. The resonant converter circuit includes an input power supply, a multi-level inverter circuit 110, resonant units 120, a transformer 130, a rectifier circuit 140, and an output filter circuit 150.

A three-phase resonant converter circuit is shown in FIG. 3. The multi-level inverter circuit 110 includes three multi-level bridge arms; there are three resonant units 120 that are connected to three upstream multi-level bridge arms respectively in a one-to-one mode; the transformer 130 is a three-phase transformer, which may be implemented by three independent single-phase transformers; and the rectifier circuit 140 includes three rectifier bridge arms, each of which may be implemented by a diode rectifier bridge. The output filter circuit 150 may be implemented by a filter capacitor.

Three input terminals of the multi-level inverter circuit 110 are connected to the input power supply, and three output terminals are connected to three input terminals of the resonant units 120 respectively in a one-to-one mode. Three output terminals of the resonant units 120 are connected to three primary-side windings of the transformer 130 respectively in a one-to-one mode, and three secondary-side windings are connected to three input terminals of the rectifier circuit 140 respectively in a one-to-one mode; and output terminals of the rectifier circuit 140 are connected to an input terminal of the output filter circuit 150, and an output terminal of the output filter circuit 150 is connected to a load.

The multi-level inverter circuit 110 is configured to convert a voltage signal output by the input power supply into a square wave voltage signal, making a voltage amplitude of the square wave voltage signal less than or equal to a voltage amplitude of the input power supply by controlling switching statuses of switching transistors in the multi-level inverter circuit.

A voltage signal output by the resonant unit 120 is input to the rectifier circuit 140 after being converted by the transformer 130, and is input to the output filter circuit 150 for wave filtering after being rectified by the rectifier circuit 140, and finally a steady output voltage is obtained.

When an output voltage gain of the LLC resonant converter circuit is needed to be relatively low, the multi-level inverter circuit 110 is controlled to reduce an amplitude of the output voltage to reduce an input voltage of the resonant unit 120. The reduced input voltage of the resonant unit 120 results in a drop in an output voltage of the resonant unit 120, and leads to a drop in an output voltage of the entire LLC resonant converter.

In an application scenario of a single-phase resonant converter circuit, the multi-level inverter circuit 110 includes one multi-level bridge arm; there is one resonant unit 120; the transformer 130 is one single-phase transformer; and the rectifier circuit 140 includes one rectifier bridge arm.

Figure 4:
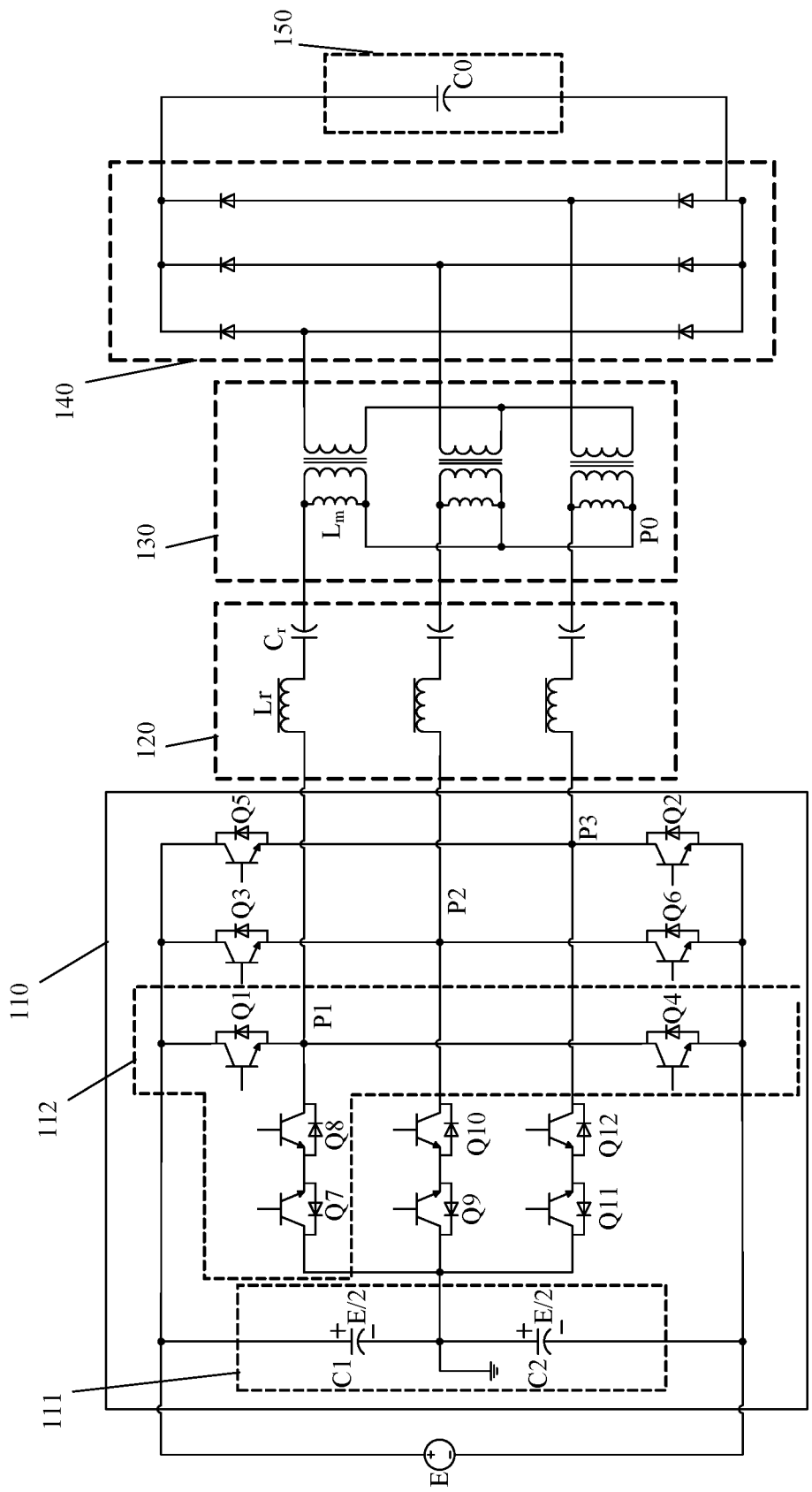
FIG. 4 is a schematic principle diagram of a resonant converter circuit according to an embodiment of this application.

FIG. 4 is a schematic principle diagram of a resonant converter circuit according to an embodiment of this application. A three-phase resonant converter is shown in FIG. 4. This embodiment describes in detail circuit structures of a multi-level inverter circuit 110, a resonant unit 120, a transformer 130, a rectifier circuit 140, and an output filter circuit 150.

As shown in FIG. 4, the multi-level inverter circuit 110 includes a bleeder circuit 111 and three multi-level bridge arms 112.

The bleeder circuit 111 includes capacitors C1 and C2 with a same capacitance. C1 and C2 are connected in series and then connected to two ends of an input power supply, and a middle point between C1 and C2 is connected to a ground terminal.

The three multi-level bridge arms 112 are T-shaped three-level bridge arms. Each three-level bridge arm includes four switching transistors, where two switching transistors form a vertical bridge, and the other two switching transistors form a horizontal bridge.

The switching transistors in this embodiment may be implemented by any one or more types of switching devices, such as MOS transistors, IGBT transistors, GaN transistors, and JFET transistors.

In this embodiment, NMOS transistors are used as an example of the switching devices for description. A drain electrode of the NMOS transistor is a first terminal of the switching transistor, a source electrode is a second terminal of the switching transistor, and a gate electrode is a control terminal of the switching transistor.

A multi-level bridge arm corresponding to one phase is used as an example for description. The multi-level bridge arm includes Q1, Q4, Q7, and Q8.

A drain electrode of Q1 is connected to C1 as an input terminal of the multi-level bridge arm, and a source electrode of Q1 is connected to a drain electrode of Q4; and a source electrode of Q4 is connected to C2 as another input terminal of the multi-level bridge arm. Q1 and Q4 form a vertical bridge of the multi-level bridge arm, and a connection point between Q1 and Q4 is a bridge arm middle point of the multi-level bridge arm. A drain electrode of Q7 is connected to a middle point between C1 and C2, a source electrode of Q7 is connected to a source electrode of Q8, a drain electrode of Q8 is connected to the connection point between Q1 and Q4, and Q7 and Q8 form a horizontal bridge of the multi-level bridge arm.

A voltage of the input power supply is denoted by E. Because E is equally divided between the capacitors C1 and C2 and the middle point between C1 and C2 is clamped at an electric potential 0, a voltage of C1 is E/2, and a voltage of C2 is −E/2. Therefore, three levels E/2, 0, and −E/2 may be obtained at the bridge arm middle point of the T-shaped three-level bridge arm.

There are three resonant units 120. Each resonant unit includes a resonant inductor Lr, a resonant capacitor Cr, and an excitation inductor Lm, where Lm is excitation inductance of the transformer 130. One terminal of Lr is connected to the bridge arm middle point of the multi-level bridge arm, the other terminal of Lr is connected to one terminal of Cr, and the other terminal of Cr is connected to a primary-side winding of the transformer 130.

In this embodiment, the transformer 130 may be three single-phase transformers. Primary-side windings of the three transformers are connected to output terminals of the three upstream resonant units respectively. Secondary-side windings of the three single-phase transformers are connected to middle points of three downstream rectifier bridge arms respectively in a one-to-one mode.

The rectifier circuit 140 includes three rectifier bridge arms. Each rectifier bridge arm may be implemented by a half-bridge rectifier circuit. The output filter circuit 150 may be implemented by a filter capacitor.

The following uses one phase as an example to describe a working principle of the LLC resonant converter circuit in detail.

Because the multi-level inverter circuit 110 is implemented by a three-level bridge arm, three levels E/2, 0, and −E/2 can be generated at the bridge arm middle point. Therefore, an amplitude of a square wave voltage signal output at the bridge arm middle point may be E/2, so that a voltage that is input to the resonant unit drops by half.

In this embodiment, an output voltage gain M=0.5 is used as a critical point to control working modes of the LLC resonant converter circuit. M=0.5 is a typical gain calculated when a transformer turn ratio is 1. When the transformer turn ratio is another value, M is a value corresponding to that turn ratio.

(1) Working Mode 1

When the output voltage gain M of the LLC resonant converter circuit is greater than 0.5, or when an output voltage is greater than a threshold voltage, the LLC resonant converter circuit is controlled to work in the working mode 1.

The output voltage may be calculated based on a formula 1.

$$V_{out}=M*V_{in}/n \quad \text{(Formula 1)}$$

In the formula 1, Vout is an output voltage of the LLC resonant converter circuit, Vin is a voltage of an input power supply, M is an output voltage gain of the LLC resonant converter circuit, and n is a transformer turn ratio.

A corresponding typical value of the threshold voltage is calculated by giving M the value 0.5. In actual application, the threshold voltage may be adjusted near the typical value.

In the working mode 1, the T-shaped three-level bridge arm is controlled to generate a square wave voltage signal with a voltage amplitude E/2 (that is, a square wave with amplitudes E/2 and −E/2) at the bridge arm middle point (that is, a point P1). A level difference of the square wave voltage signal is E, and therefore the input voltage of the resonant unit is E.

In the working mode 1, drive control logic of the switching transistors is shown in Table 1.

TABLE 1

| Working mode | Switching transistor state (1 for on and 0 for off) | | | | Voltage at the bridge arm middle point |
|---|---|---|---|---|---|
| | Q1 | Q4 | Q7 | Q8 | P1 |
| Working mode 1 | 1 | 0 | 0 | 0 | E/2 |
| | 0 | 1 | 0 | 0 | −E/2 |

Figure 5:
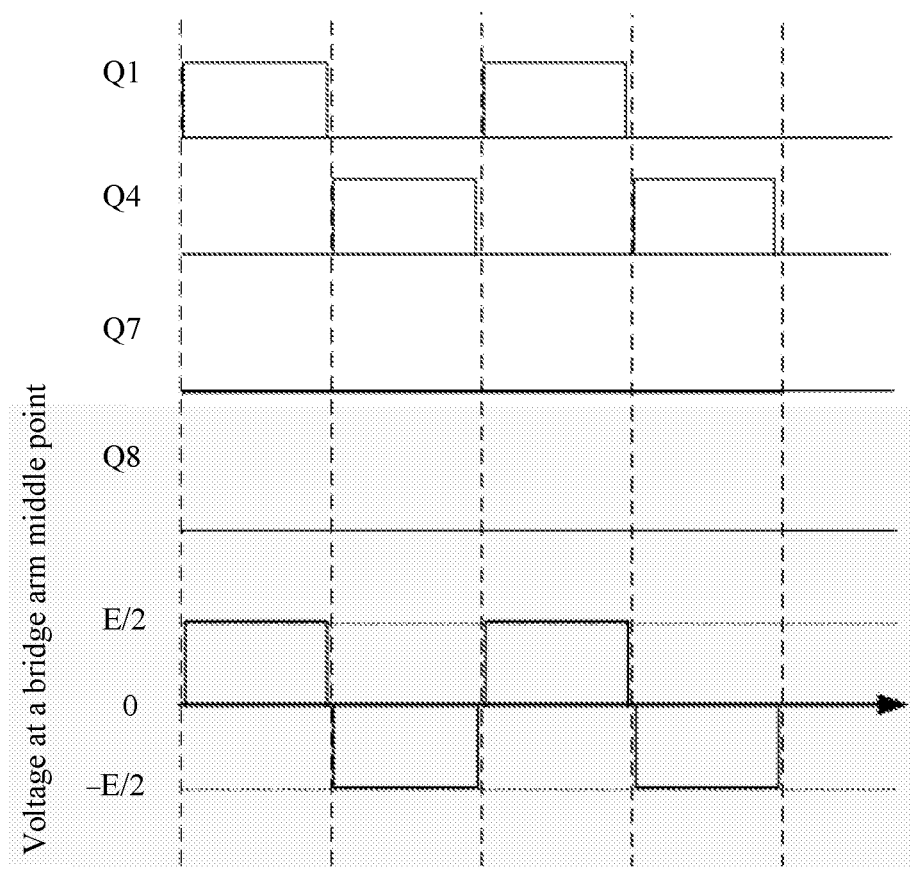
FIG. 5 is a schematic diagram of waveforms at corresponding key points when the resonant converter circuit shown in FIG. 4 is in a working mode 1.

FIG. 5 is a schematic diagram of voltage waveforms at key points when the LLC resonant converter circuit is in the working mode 1. As shown in FIGS. 5, Q1 and Q4 are complementarily conducted at approximately a duty cycle of 50%. Q7 and Q8 do not work, and therefore do not affect output efficiency.

As shown in FIG. 4, when Q1 is on, the voltage at the bridge arm middle point P1 is equal to the voltage E/2 of C1; and when Q4 is on, the voltage at the bridge arm middle point P1 is equal to the voltage −E/2 of C2. A waveform of the voltage output at the bridge arm middle point P1 is a waveform corresponding to P1 shown in FIG. 5. The level difference of the square wave voltage signal is E.

(2) Working Mode 2

When M of the LLC resonant converter circuit is less than or equal to 0.5, or when an output voltage is less than or equal to a threshold voltage, the LLC resonant converter circuit is controlled to work in the working mode 2.

In this working mode, the T-shaped three-level bridge arm is controlled to generate a square wave voltage signal with amplitudes 0 and E/2 or −E/2 and 0 at a bridge arm middle point P1. A level difference of the square wave voltage signal is E/2, and therefore the input voltage of the resonant unit is E/2.

Drive control logic of the working mode 2 is shown in Table 2.

| Working mode | Switching transistor state (1 for on, 0 for off, and — for either on or off) | | | | Voltage at the bridge arm middle point |
|---|---|---|---|---|---|
| | Q1 | Q4 | Q7 | Q8 | P1 |
| Mode 2: manner A | 1 | 0 | — | 0 | E/2 |
| | 0 | 0 | 1 | 1 | 0 |
| Mode 2: manner B | 0 | 1 | 0 | — | −E/2 |
| | 0 | 0 | 1 | 1 | 0 |

Figure 6:
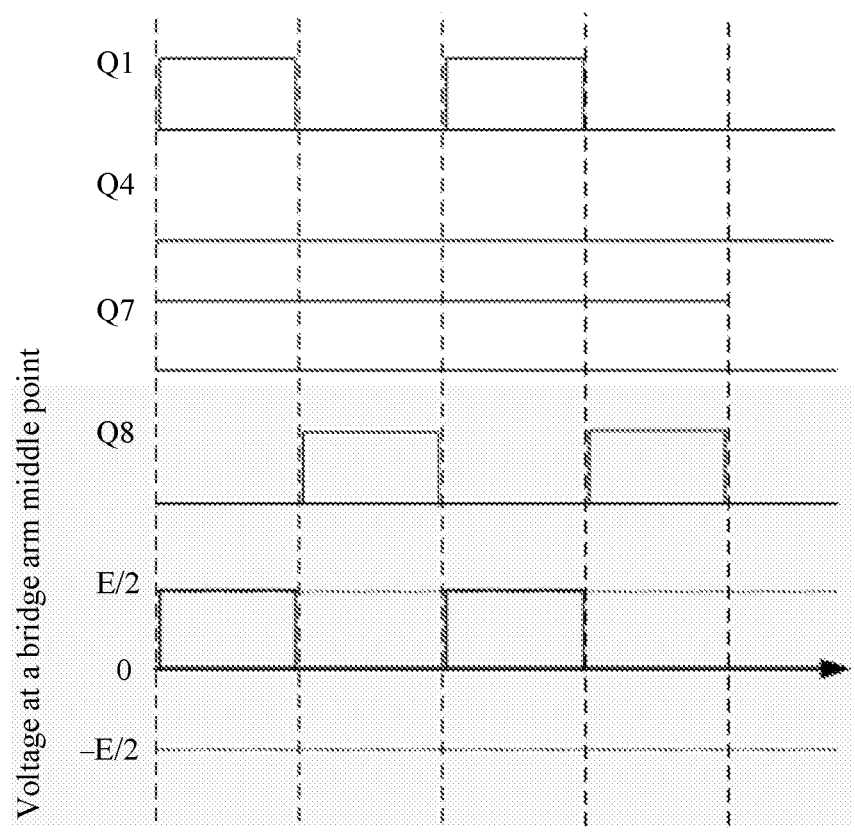
FIG. 6 is a schematic diagram of waveforms at corresponding key points when the resonant converter circuit shown in FIG. 4 is in a manner A of a working mode 2.

FIG. 6 is a schematic diagram of waveforms at key points in the manner A of the working mode 2. Q1 and Q8 are alternately conducted at approximately a duty cycle of 50%, and Q7 may be always on.

When Q1 is on, the voltage at the bridge arm middle point P1 is equal to the voltage E/2 of C1; and when Q7 and Q8 are on, voltage drops of Q7 and Q8 may be ignored, and the voltage at the bridge arm middle point is equal to a voltage at a bleeder circuit middle point, that is, equal to 0. In this working mode, an output voltage at the bridge arm middle point is 0 or E/2. Therefore, the input voltage of the resonant unit is E/2.

Figure 7:
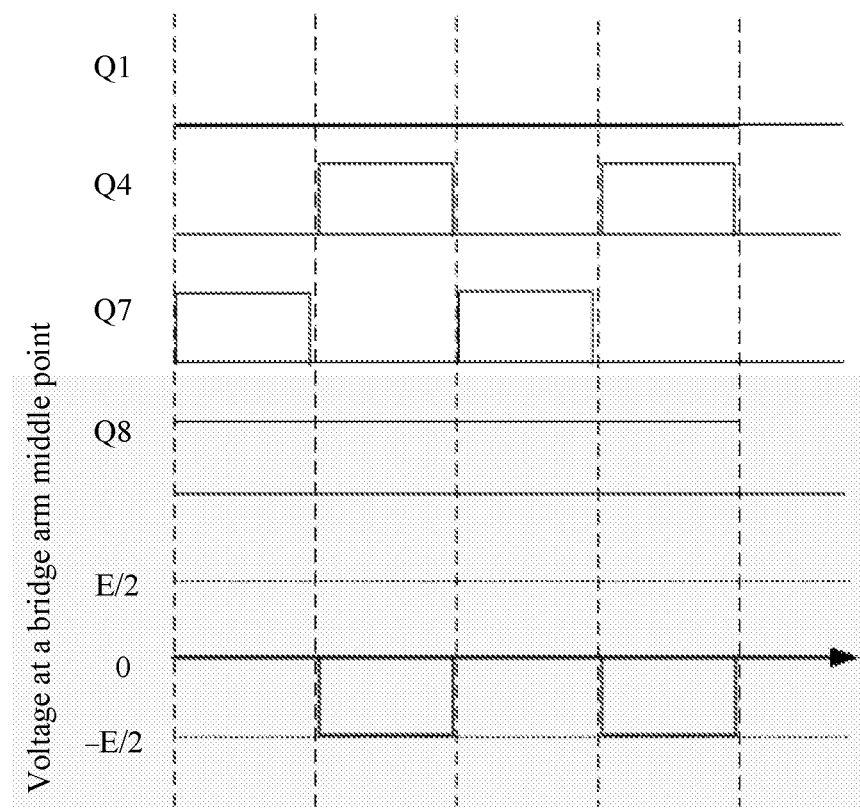
FIG. 7 is a schematic diagram of waveforms at corresponding key points when the resonant converter circuit shown in FIG. 4 is in a manner B of a working mode 2.

FIG. 7 is a schematic diagram of waveforms at key points in the manner B of the working mode 2. Q4 and Q7 are alternately on at approximately a duty cycle of 50%, and Q8 may be always on.

When Q4 is on, the voltage at the bridge arm middle point P1 is equal to the voltage −E/2 of C2; and when Q7 and Q8 are on, voltage drops of Q7 and Q8 may be ignored, and the voltage at the bridge arm middle point is equal to a voltage at a bleeder circuit middle point, that is, equal to 0. In this working mode, an output voltage at the bridge arm middle point is −E/2 or 0. Therefore, the input voltage of the resonant unit is E/2.

From the working process of the working mode 2, it can be learned that only the capacitor C1 provides energy in the manner A, and only the capacitor C2 provides energy in the manner B. In actual work, the manner A and the manner B may work alternately to maintain a voltage balance between C1 and C2.

The other two phases of the three-phase circuit have the same working principle as the foregoing working process, with a difference being a 120° phase difference in one drive control signal corresponding to the three phases. For example, the same drive control logic is applied to Q1, Q3, and Q5 in three phases A, B, and C, but there is a 120° phase difference in a control signal corresponding to the three phases.

In the resonant converter circuit provided in this embodiment, a three-level converter circuit is placed before the resonant unit. The three-level converter circuit may obtain a square wave voltage signal with a voltage amplitude E or E/2, and use the square wave voltage signal as the input voltage of the downstream resonant unit. When a required output voltage is relatively low, an output voltage of the three-level converter circuit can be decreased to reduce the input voltage of the resonant unit, and finally reduce the output voltage of the entire resonant converter circuit. In this process, the final output voltage is adjusted by adjusting the input voltage of the resonant unit, with no need to substantially adjust a switching frequency of the resonant converter circuit. Therefore, when the output voltage is relatively low, the resonant converter circuit can still work near its resonant frequency, thereby reducing a semiconductor switching loss under low-voltage output, and improving conversion efficiency and load capacity of the resonant converter circuit under low-voltage output.

Figure 8:
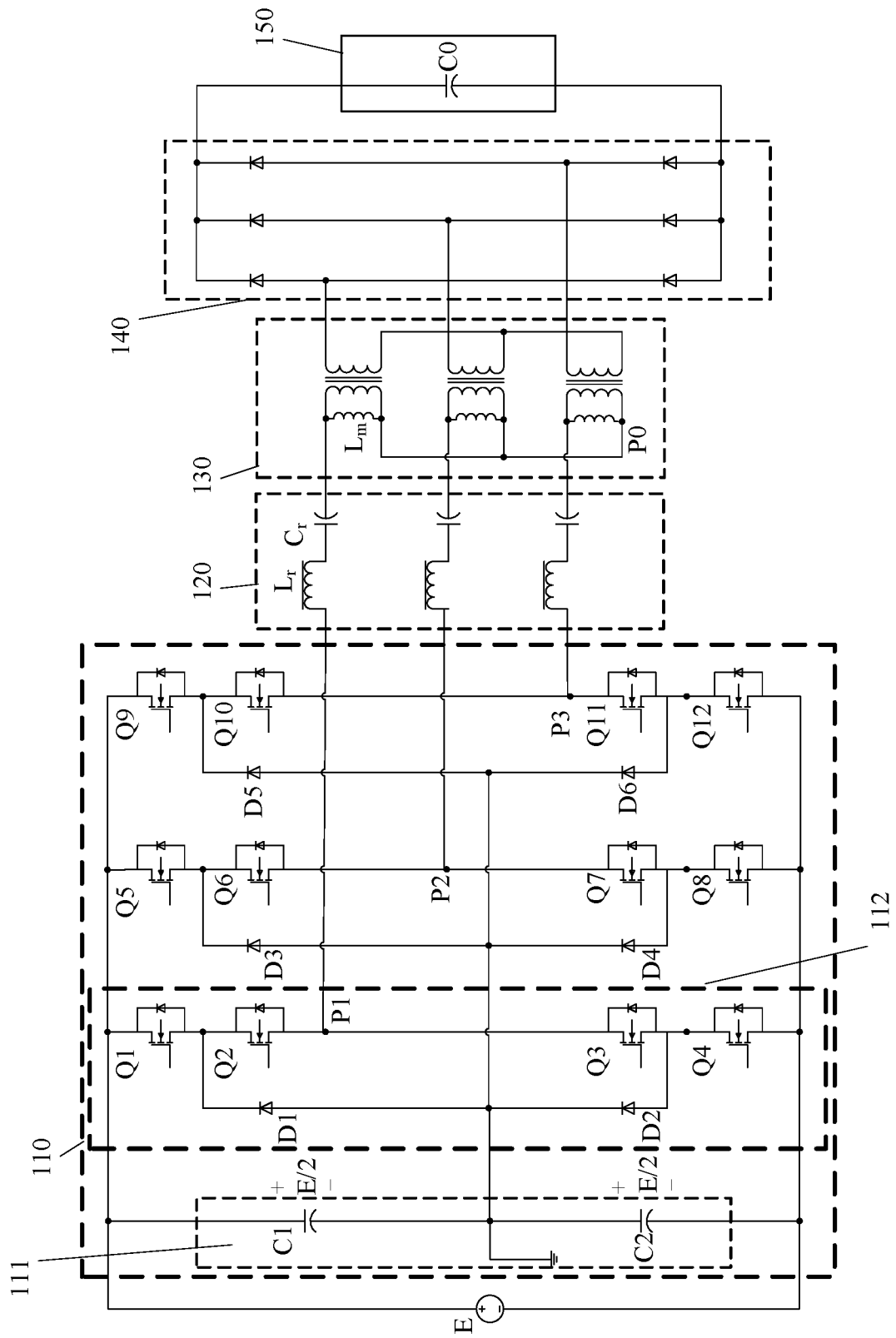
FIG. 8 is a schematic principle diagram of another resonant converter circuit according to an embodiment of this application.

FIG. 8 is a schematic principle diagram of another resonant converter circuit according to an embodiment of this application. In this embodiment, a multi-level bridge arm is implemented by an I-shaped three-level bridge arm.

As shown in FIG. 8, each I-shaped three-level bridge arm includes switching transistors Q1, Q2, Q3, and Q4, and diodes D1 and D2. Other parts are the same as those in the embodiment shown in FIG. 4, and details are not described herein again.

The following uses one phase as an example to describe a working process of the resonant converter circuit.

Drive control logic of switching transistors in the circuit shown in FIG. 8 is shown in Table 3.

TABLE 3

| Output gain | Working mode | Switching transistor state (1 for on and 0 for off) | | | | Voltage at the bridge arm middle point |
|---|---|---|---|---|---|---|
| | | Q1 | Q2 | Q3 | Q4 | P1 |
| M > 0.5 | Working mode 1 | 1 | 1 | 0 | 0 | E/2 |
| | | 0 | 0 | 1 | 1 | −E/2 |
| M ≤ 0.5 | Working mode 2: manner A | 1 | 1 | 0 | 0 | E/2 |
| | | 0 | 1 | 1 | 0 | 0 |
| | Working mode 2: manner B | 0 | 1 | 1 | 0 | 0 |
| | | 0 | 0 | 1 | 1 | −E/2 |

In this embodiment, the multi-level inverter circuit is a three-level converter circuit. Therefore, M=0.5 is used as a critical point for working mode switching. M=0.5 is a typical value calculated when a transformer turn ratio is 1. When the turn ratio is another value, the gain value changes accordingly.

1. Working Mode 1

When M>0.5, or when an output voltage is greater than a threshold voltage, the LLC resonant converter circuit is controlled to work in the working mode 1. The threshold voltage may be calculated based on the formula 1.

When Q1 and Q2 are on, the voltage at the bridge arm middle point P1 is equal to a voltage E/2 of C1; and when Q3 and Q4 are on, the voltage at the bridge arm middle point P1 is equal to a voltage −E/2 of C2. In the working mode 1, an output voltage at the bridge arm middle point is a square wave signal with amplitudes −E/2 and E/2. Therefore, an input voltage of a resonant unit is a level difference E of the square wave signal.

2. Working Mode 2

When M≤0.5, or when an output voltage is less than or equal to the threshold voltage, the LLC resonant converter circuit is controlled to work in the working mode 2. The working mode 2 includes the manner A and the manner B.

(1) Manner A

When Q1 and Q2 are on, the voltage at the bridge arm middle point P1 is equal to a voltage E/2 of C1. When Q1 is off and Q2 and Q3 are on, a current on Lr cannot change abruptly, and the current on Lr flows from left to right. In this case, D1 and Q2 function as a freewheeling loop of Lr, and make the voltage at the bridge arm middle point P1 equal to 0. In this working mode, an output voltage at the bridge arm middle point is a square wave signal with amplitudes 0 and E/2. Therefore, an input voltage of a resonant unit is E/2.

(2) Manner B

When Q2 and Q3 are on, the voltage at the bridge arm middle point P1 is equal to 0. In this state, Q3 and D2 function as a freewheeling loop of Lr. When Q3 and Q4 are on, the voltage at the bridge arm middle point P1 is equal to −E/2. That is, the voltage at the bridge arm middle point is a square wave signal with amplitudes 0 and −E/2. Therefore, an input voltage of a resonant unit is E/2.

In the resonant converter circuit provided in this embodiment, the three-level converter circuit is placed before the resonant unit. The three-level converter circuit may obtain a square wave voltage signal with a voltage amplitude E or E/2, and use the square wave voltage signal as the input voltage of the downstream resonant unit. The final output voltage is adjusted by adjusting the input voltage of the resonant unit, with no need to adjust a switching frequency of the resonant converter circuit. Therefore, when the output voltage is relatively low, the resonant converter circuit can still work near its resonant frequency, reducing a semiconductor switching loss, and thereby improving conversion efficiency and load capacity of the resonant converter circuit under low-voltage output.

Figure 9:
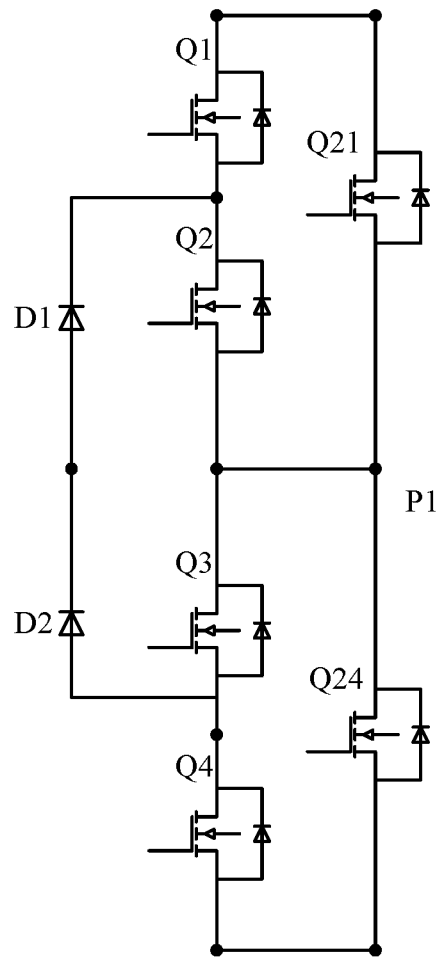
FIG. 9 is a schematic circuit diagram of a three-level bridge arm applied in a resonant converter circuit according to an embodiment of this application.

In another embodiment of this application, a three-level bridge arm may be implemented by a three-level bridge arm circuit shown in FIG. 9. The three-level bridge arm includes switching transistors Q1, Q2, Q3, Q4, Q21, and Q24, and diodes D1 and D2.

A difference between the three-level bridge arm shown in FIG. 9 and the I-shaped three-level bridge arm shown in FIG. 8 is that Q21 is connected in parallel to two ends of a series branch formed by Q1 and Q2, and Q24 is connected in parallel to two ends of a series branch formed by Q3 and Q4. Other circuit structures are the same as those of the circuit shown in FIG. 8, and details are not described herein again.

A conduction voltage drop of Q21 is greater than a conduction voltage drop of the switching transistor Q1 alone, but less than the sum of conduction voltage drops of Q1 and Q2. Therefore, after Q1 and Q2 are on, controlling Q21 to be on can reduce a conduction loss of the circuit. Q24 functions the same as Q21.

Figure 10:
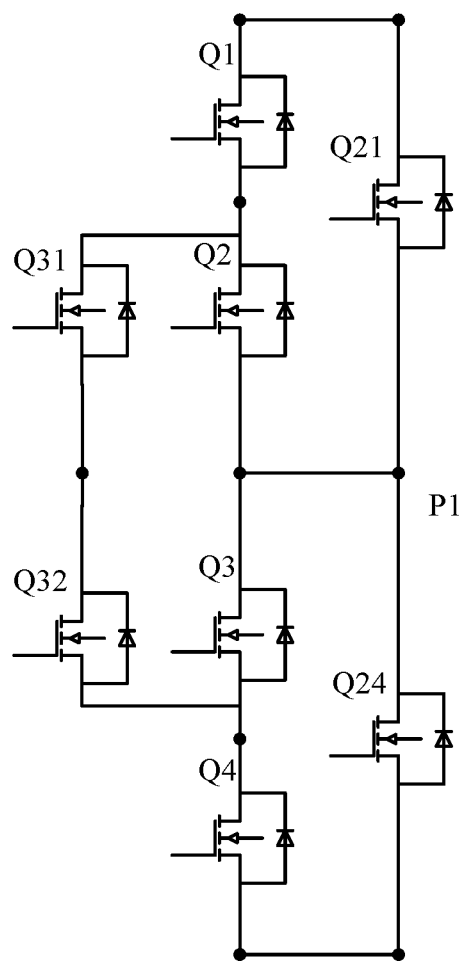
FIG. 10 is a schematic circuit diagram of still another three-level bridge arm applied in a resonant converter circuit according to an embodiment of this application.

In still another embodiment of this application, a three-level bridge arm may be implemented by a three-level bridge arm circuit shown in FIG. 10. A difference between this three-level bridge arm and the three-level bridge arm shown in FIG. 9 is that a switching transistor Q31 is used as a substitute for the diode D1, and a switching transistor Q32 is used as a substitute for the diode D2. Q31 and Q32 are always off. In other words, Q31 and Q32 do not work. Drive control logic of this three-level bridge arm is the same as the drive control logic of the three-level bridge arm shown in FIG. 8, and details are not described herein again.

A conduction voltage drop of Q31 is less than a conduction voltage drop of a diode. Therefore, Q31 functions to reduce a conduction loss. Q32 functions the same as Q31.

Figure 11:
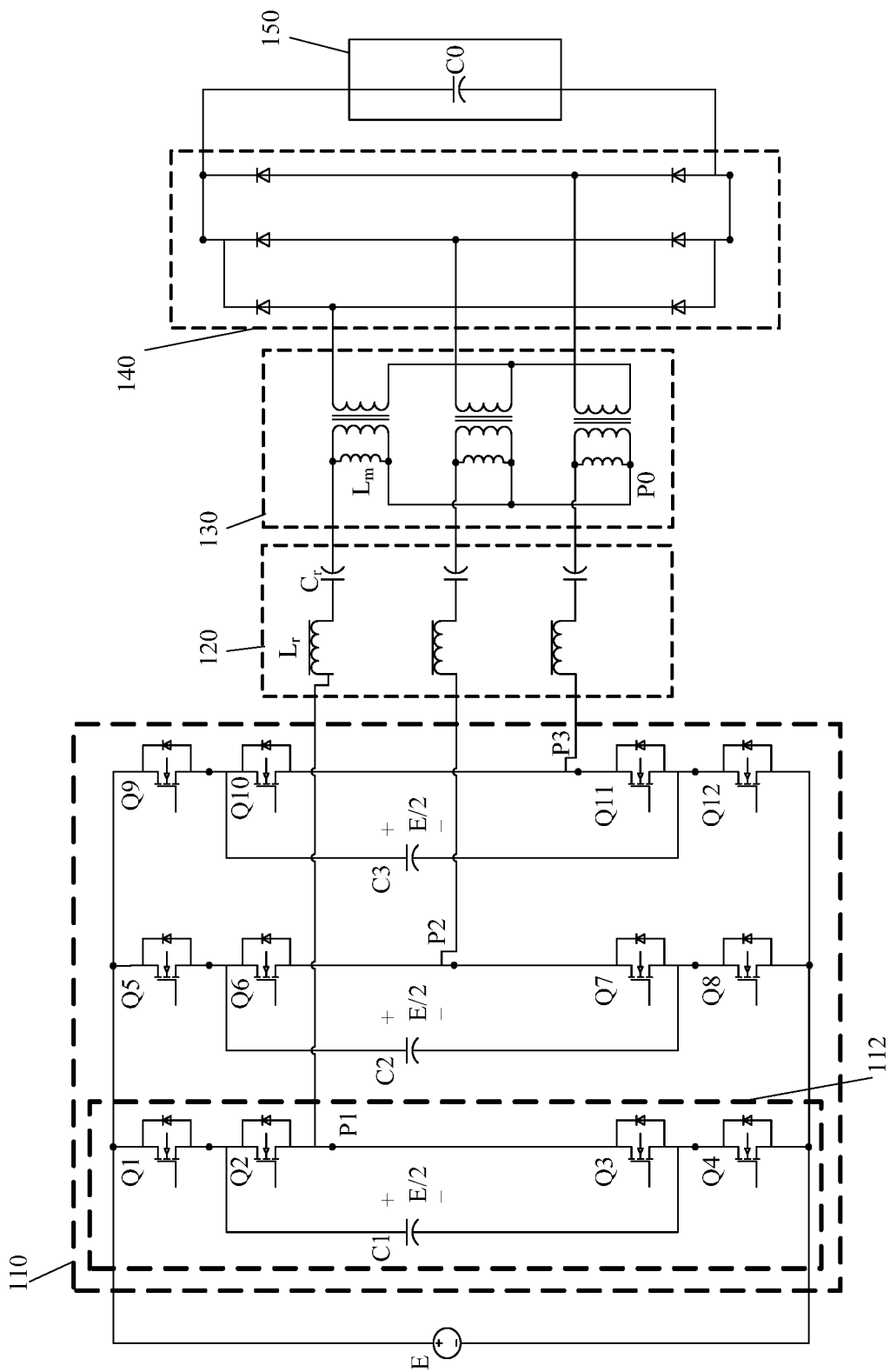
FIG. 11 is a principle block diagram of still another resonant converter circuit according to an embodiment of this application.

FIG. 11 is a schematic principle diagram of another resonant converter circuit according to an embodiment of this application. A difference between this embodiment and the embodiment shown in FIG. 4 is that a multi-level inverter circuit in this embodiment is implemented by capacitor-clamped multi-level bridge arms. Each multi-level bridge arm obtains electricity directly from an input power supply, with no need of an extra bleeder circuit. Therefore, there is no voltage balance problem between bleeder capacitors.

In this embodiment, the circuits except the multi-level inverter circuit may be the same as those in FIG. 4, and details are not described herein again. This embodiment focuses on a working process of the capacitor-clamped multi-level bridge arm.

As shown in FIG. 11, the multi-level inverter circuit includes three capacitor-clamped three-level bridge arms, each including four switching transistors and a clamping capacitor. The following uses a capacitor-clamped three-level bridge arm in one phase of circuit as an example for detailed description.

The capacitor-clamped three-level bridge arm includes switching transistors Q1 to Q4, and a clamping capacitor C1. Q1 to Q4 are sequentially connected in series to form a series branch; and a drain electrode of Q1 is connected to one end of the input power supply as one end of the series branch, and a source electrode of Q4 is connected to the other end of the input power supply as the other end of the series branch. A connection point between Q2 and Q3 is a bridge arm middle point; and a positive electrode of C1 is connected to a connection point between Q1 and Q2, and a negative electrode of C1 is connected to a connection point between Q3 and Q4.

A voltage of the input power supply is E, a voltage of the clamping capacitor C1 is E/2, and the capacitor-clamped three-level bridge arm can output three levels: E, E/2, and 0.

Drive control logic of the capacitor-clamped three-level bridge arm is shown in Table 4.

TABLE 4

| Output gain | Working mode | Switching transistor state (1 for on and 0 for off) | | | | Voltage at the bridge arm middle point P1 |
|---|---|---|---|---|---|---|
| | | Q1 | Q2 | Q3 | Q4 | |
| M > 0.5 | Working mode 1 | 1 | 1 | 0 | 0 | E |
| | | 0 | 0 | 1 | 1 | 0 |
| M ≤ 0.5 | Working mode 2 | 1 | 0 | 1 | 0 | E/2 |
| | | 0 | 1 | 0 | 1 | |
| | | 0 | 0 | 1 | 1 | 0 |

State 1: Q1 and Q2 are on, and the voltage at the bridge arm middle point is equal to a voltage at a positive electrode of the input power supply, that is, E.

State 2: Q3 and Q4 are on, and the voltage at the bridge arm middle point is equal to a voltage at a negative electrode of the input power supply, that is, 0.

State 3: Q1 and Q3 are on. The input power supply charges the clamping capacitor C1, the voltage of the input power supply is E, and the voltage of C1 is equal to E/2 in a steady state. Therefore, the voltage at the bridge arm middle point is equal to E/2.

State 4: Q2 and Q4 are on. The clamping capacitor C1 discharges. Therefore, the voltage at the bridge arm middle point is equal to the voltage of C1, that is, E/2.

The voltages at the bridge arm middle point corresponding to the state 3 and the state 4 are both E/2. The clamping capacitor C1 is charged in the state 3, but discharges in the state 4. In actual application, which state is active is controlled based on the voltage of the clamping capacitor C1.

In this embodiment, the multi-level inverter circuit is a three-level converter circuit. Therefore, M=0.5 is used as a critical point for working mode switching. M=0.5 is a typical value calculated when a transformer turn ratio is 1. When the turn ratio is another value, the gain value changes accordingly.

When M>0.5, the LLC resonant converter circuit is controlled to work in the working mode 1. In this working mode, the state 1 and the state 2 are active alternately, and the voltage at the bridge arm middle point is a square wave signal with amplitudes 0 and E. Therefore, an input voltage of a resonant unit is E.

When M≤0.5, the LLC resonant converter circuit is controlled to work in the working mode 2. In this working mode, the state 3 (or the state 4) and the state 2 are active alternately, where the state 3 and the state 4 are active alternately depending on an actual requirement. The voltage at the bridge arm middle point is a square wave signal with amplitudes 0 and E/2. Therefore, an input voltage of a resonant unit is E/2.

Figure 12:
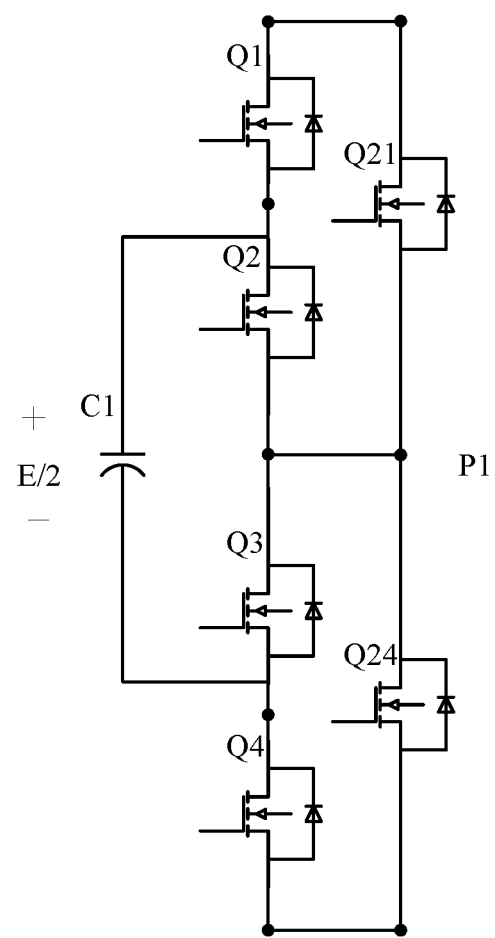
FIG. 12 is a schematic circuit diagram of a capacitor-clamped three-level bridge arm applied in the resonant converter circuit shown in FIG. 11.

FIG. 12 is a schematic circuit diagram of another capacitor-clamped three-level bridge arm according to an embodiment of this application. A difference between the multi-level bridge arm provided in this embodiment and the three-level bridge arm shown in FIG. 11 is that switching transistors Q21 and Q24 are added.

Q21 bridges two ends of a series branch formed by Q1 and Q2, and Q24 bridges two ends of a series branch formed by Q3 and Q4. Q21 and Q24 function to reduce a conduction voltage drop.

A switching status of the capacitor-clamped three-level bridge arm is the same as the switching status of the three-level bridge arm shown in FIG. 9, and details are not described herein again.

In a resonant converter circuit provided in this embodiment, a multi-level inverter circuit is implemented by capacitor-clamped multi-level bridge arms. Each multi-level bridge arm obtains electricity directly from an input power supply, with no need of an extra bleeder circuit formed by two bleeder capacitors. Therefore, for this type of resonant converter circuit, there is no voltage balance problem between bleeder capacitors, and control is easier.

In still another embodiment of this application, a multi-level inverter circuit may be implemented by a five-level converter circuit.

Figure 13:
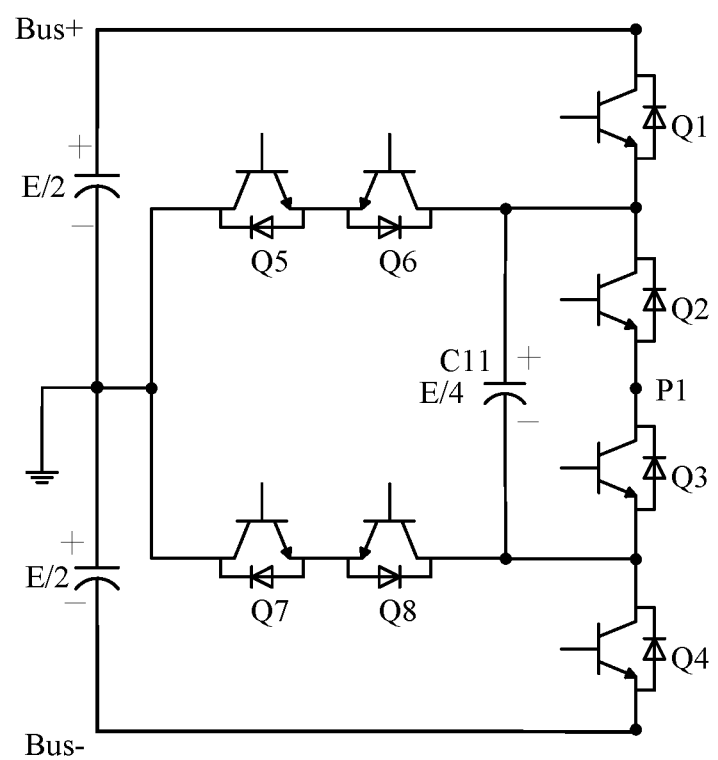
FIG. 13 is a schematic circuit diagram of a five-level bridge arm applied in a resonant converter circuit according to an embodiment of this application.

FIG. 13 is a schematic circuit diagram of a five-level bridge arm applied in a resonant converter circuit. A difference between this embodiment and the embodiment shown in FIG. 4 is that the three-level bridge arms in FIG. 4 are replaced by five-level bridge arms, while other parts are the same as those in FIG. 4. This embodiment focuses on work of a five-level converter circuit and a working mode switching process of the LLC resonant converter circuit.

As shown in FIG. 13, the five-level bridge arm includes switching transistors Q1 to Q8, and a clamping capacitor C11.

A series branch resulting from sequentially connecting Q1, Q2, Q3, and Q4 in series is connected to two ends of a bleeder circuit. A drain electrode of Q1 is connected to C1, a source electrode of Q1 is connected to a drain electrode of Q2, a source electrode of Q2 is connected to a drain electrode of Q3, a source electrode of Q3 is connected to a drain electrode of Q4, and a source electrode of Q4 is connected to C2. A connection point between Q2 and Q3 is a bridge arm middle point.

C11 is connected in parallel to two ends of a connection branch formed by Q2 and Q3; and when C11 is in a steady state, voltages of the two ends are equal to E/4.

Q5 and Q6 bridge between a bleeder circuit middle point O and a connection point between Q1 and Q2. A drain electrode of Q5 is connected to the bleeder circuit middle point, a source electrode of Q5 is connected to a source electrode of Q6, and a drain electrode of Q6 is connected to the connection point between Q1 and Q2.

Q7 and Q8 bridge between the bleeder circuit middle point O and a connection point between Q3 and Q4. Connection manners of Q7 and Q8 are the same as those of Q5 and Q6, and details are not described herein again.

Signals of five levels E/2, E/4, 0, −E/4, and −E/2 can be obtained at the bridge arm middle point of the five-level bridge arm. Drive control logic of the five-level bridge arm is shown in the following table.

TABLE 5

| \multicolumn{8}{c}{Switching transistor state (1 for on, 0 for off, and — for either on or off)} | Output level at the bridge |
|---|---|---|---|---|---|---|---|---|
| Q1 | Q2 | Q3 | Q4 | Q5 | Q6 | Q7 | Q8 | arm middle point |
| 1 | 1 | 0 | 0 | — | 0 | — | 0 | E/2 |
| 1 | 0 | 1 | 0 | — | 0 | — | 0 | E/4 |
| 0 | 1 | 0 | 0 | — | 0 | 1 | 1 |  |
| 0 | 0 | 1 | 0 | — | 0 | 1 | 1 | 0 |
| 0 | 1 | 0 | 0 | 1 | 1 | 0 | — |  |
| 0 | 0 | 1 | 0 | 1 | 1 | 0 | — | −E/4 |
| 0 | 1 | 0 | 1 | 0 | — | 0 | — |  |
| 0 | 0 | 1 | 1 | 0 | — | 0 | — | −E/2 |

The following describes various states of the five-level bridge arm one by one in combination with the foregoing table.

State 1: Q1 and Q2 are on. A voltage at the bridge arm middle point P1 is equal to a voltage of C1, that is, E/2.

State 2: Q1 and Q3 are on. C1 charges the clamping capacitor C11 through Q1 and Q3. The voltage at the bridge arm middle point is equal to the voltage of C1 minus a voltage of C11, that is, E/2−E/4=E/4.

State 3: Q2, Q5, Q7, and Q8 are on. Q7 and Q8 being on make a voltage at a negative electrode of C11 equal to 0. When C11 is in a steady state, the voltage of C11 is equal to E/4. Therefore, a voltage at a positive electrode of C11 is E/4. In this state, C11 discharges, so that the voltage at the bridge arm middle point P1 is equal to the voltage E/4 of C11.

State 4: Q3, Q7, and Q8 are on. The voltage at the bridge arm middle point is equal to a voltage at the bleeder circuit middle point, that is, 0.

State 5: Q2, Q5, and Q6 are on. The voltage at the bridge arm middle point is equal to the voltage at the bleeder circuit middle point, that is, 0.

State 6: Q3, Q5, and Q6 are on. In this state, the voltage at the positive electrode of C11 is equal to 0, and the voltage at the negative electrode of C11 is equal to −E/4. Q3 being on makes the voltage at the bridge arm middle point P1 equal to the voltage at the negative electrode of C11, that is, −E/4.

State 7: Q2 and Q4 are on. In this state, Q4 being on makes the voltage at the negative electrode of C11 equal to −E/2, and makes the voltage at the positive electrode of C11 equal to −E/2+E/4=−E/4. Q2 being on makes the voltage at the bridge arm middle point equal to the voltage at the positive electrode of C11, that is, E/4.

State 8: Q3 and Q4 are on. The voltage at the bridge arm middle point P1 is equal to a voltage at a negative electrode of C2, that is, −E/2.

Figure 14:
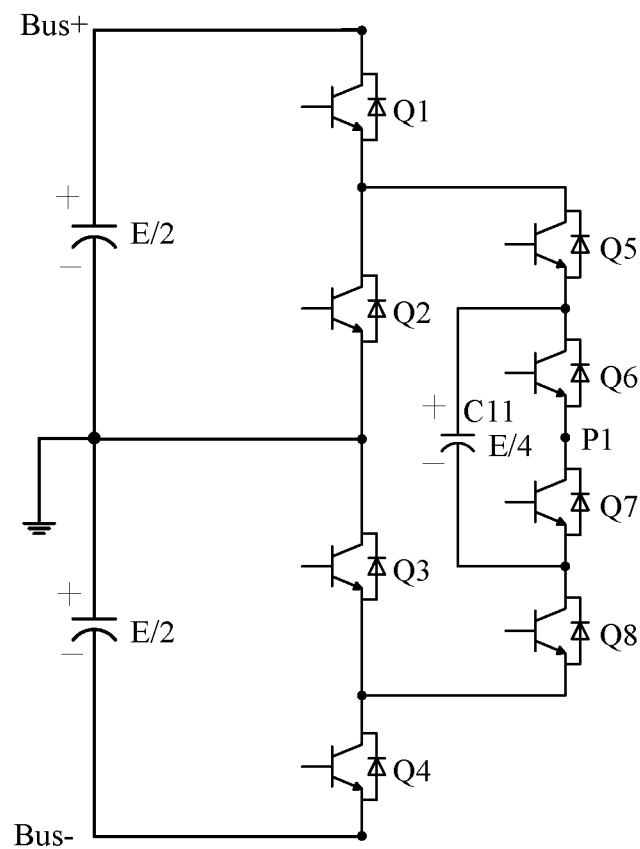
FIG. 14 is a schematic circuit diagram of another five-level bridge arm applied in a resonant converter circuit according to an embodiment of this application.

FIG. 14 is a schematic circuit diagram of another five-level bridge arm applied in a resonant converter circuit according to an embodiment of this application.

As shown in FIG. 14, the five-level bridge arm includes switching transistors Q1 to Q8, and a capacitor C11. Q1 to Q4 are sequentially connected in series to form a first series branch, and Q5 to Q8 are sequentially connected in series to form a second series branch.

A drain electrode of Q1 is connected to a positive electrode of C1 as one end of the first series branch, a source electrode of Q4 is connected to a negative electrode of C2 as the other end of the first series branch, and a connection point between Q2 and Q3 is connected to a connection point between C1 and C2. A drain electrode of Q5 is connected to a connection point between Q1 and Q2 as one end of the second series branch, a source electrode of Q8 is connected to a connection point between Q3 and Q4 as the other end of the second series branch, and a connection point between Q6 and Q7 is a bridge arm middle point P1.

A positive electrode of C11 is connected to a connection point between Q5 and Q6, a negative electrode of C11 is connected to a connection point between Q7 and Q8, and a voltage of C11 is equal to E/4.

Signals of five levels E/2, E/4, 0, −E/4, and −E/2 can be obtained at the bridge arm middle point of the five-level bridge arm. Drive control logic of the five-level bridge arm is shown in the following table.

TABLE 6

| \multicolumn{8}{c}{Switching transistor state (1 for on, 0 for off, and — for either on or off)} | Output level at the bridge |
|---|---|---|---|---|---|---|---|---|
| Q1 | Q2 | Q3 | Q4 | Q5 | Q6 | Q7 | Q8 | arm middle point |
| 1 | 0 | — | 0 | 1 | 1 | 0 | 0 | E/2 |
| 1 | 0 | — | 0 | 1 | 0 | 1 | 0 | E/4 |
| — | 0 | 1 | 0 | 0 | 1 | 0 | 1 |  |
| — | 0 | 1 | 0 | 0 | 0 | 1 | 1 | 0 |
| 0 | 1 | 0 | — | 1 | 1 | 0 | 0 |  |
| 0 | 1 | 0 | — | 1 | 0 | 1 | 0 | −E/4 |
| 0 | — | 0 | 1 | 0 | 1 | 0 | 1 |  |
| 0 | — | 0 | 1 | 0 | 0 | 1 | 1 | −E/2 |

State 1: Q1, Q5, and Q6 are on. A voltage at the bridge arm middle point is equal to a voltage of C1, that is, E/2.

State 2: Q1, Q5, and Q7 are on. C11 is charged. The voltage at the bridge arm middle point is equal to the voltage of C1 minus a voltage of C11, that is, E/2−E/4=E/4.

State 3: Q3, Q6, and Q8 are on. C11 discharges. The voltage at the bridge arm middle point is equal to the voltage of C11, that is, E/4.

State 4: Q3, Q7, and Q8 are on. The voltage at the bridge arm middle point is equal to a voltage at a bleeder circuit middle point, that is, 0.

State 5: Q2, Q5, and Q6 are on. The voltage at the bridge arm middle point is equal to the voltage at the bleeder circuit middle point, that is, 0.

State 6: Q2, Q5, and Q7 are on. In this state, a voltage at the positive electrode of C11 is equal to 0, a voltage at the negative electrode of C11 is equal to −E/4, and the voltage at the bridge arm middle point is equal to the voltage at the negative electrode of C11, that is, E/4.

State 7: Q4, Q6, and Q8 are on. In this state, the voltage at the negative electrode of C11 is equal to −E/2, and the voltage at the bridge arm middle point is equal to −E/2 plus the voltage of C11, that is, −E/2+E/4=−E/4.

State 8: Q4, Q7, and Q8 are on. In this state, the voltage at the bridge arm middle point is equal to a voltage at the negative electrode of C2, that is, −E/2.

Because the five-level bridge arm can output five different amplitudes of level at the bridge arm middle point, 10 square wave voltages of different amplitudes may be generated at an output terminal of the multi-level inverter circuit by combining any two levels, as shown in the following table.

TABLE 7

| Working mode | Amplitude of a square wave signal at the output terminal of the multi-level inverter circuit | | | |
|---|---|---|---|---|
| Working mode 1 | (E/2, −E/2) | | | |
| Working mode 3 | (E/2, −E/4) | (E/4, −E/2) | | |
| Working mode 2 | (E/2, 0) | (E/4, −E/4) | (0, −E/2) | |
| Working mode 4 | (E/2, E/4) | (E/4, 0) | (0, −E/4) | (−E/4, −E/2) |

In the working mode 1, a level difference of a square wave voltage output by the multi-level inverter circuit is E; in the working mode 2, a level difference of a square wave voltage output by the multi-level inverter circuit is 3E/4; in the working mode 3, a level difference of a square wave voltage output by the multi-level inverter circuit is E/2; and in the working mode 4, a level difference of a square wave voltage output by the multi-level inverter circuit is E/4. Therefore, there are three critical points for working mode switching: M=0.75, 0.5, and 0.25. These three values may be typical values calculated when a transformer turn ratio is 1.

Figure 15A:
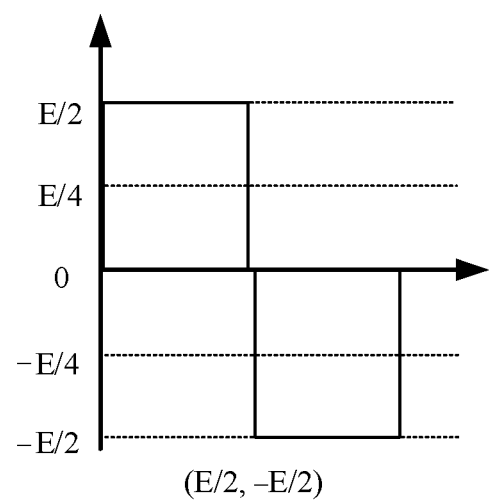
FIG. 15a is a schematic diagram of a square wave voltage signal output at a bridge arm middle point when a five-level bridge arm is in a working mode 1.

When M>0.75, or when an output voltage is greater than a first preset voltage, the LLC resonant converter circuit is controlled to work in the working mode 1. In the working mode 1, a waveform of a square wave voltage signal output by the multi-level inverter circuit is shown in FIG. 15a.

Figure 15B:
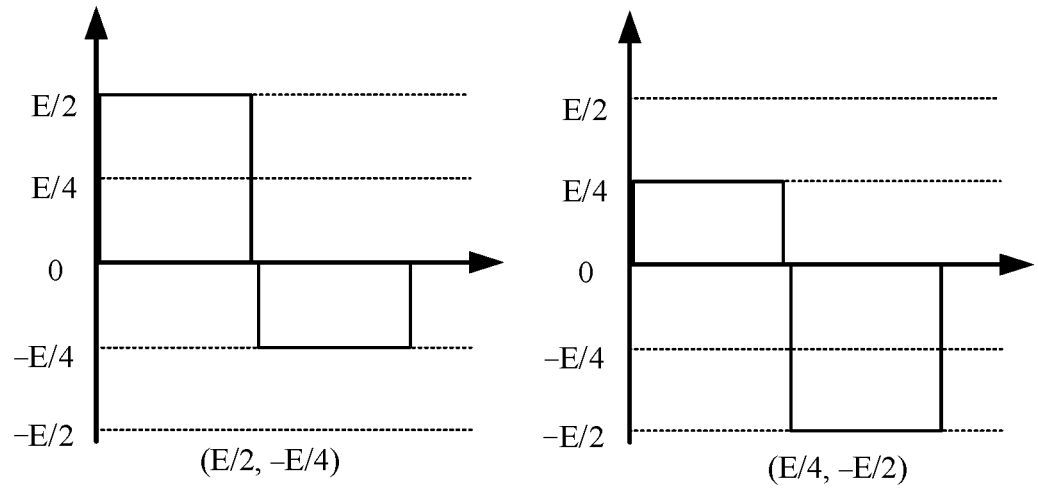
FIG. 15b is a schematic diagram of a square wave voltage signal output at a bridge arm middle point when a five-level bridge arm is in a working mode 3.

When 0.75≥M>0.5, or when an output voltage is greater than a second preset voltage and less than the first preset voltage, the LLC resonant converter circuit is controlled to work in the working mode 3. In the working mode 3, a waveform of a square wave voltage signal output by the multi-level inverter circuit is shown in FIG. 15b.

Figure 15C:
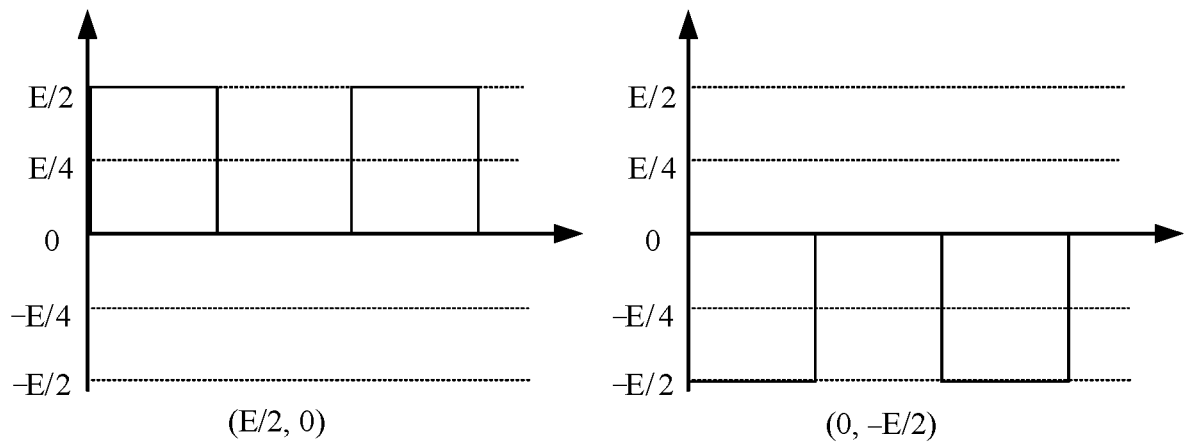
FIG. 15c is a schematic diagram of a square wave voltage signal output at a bridge arm middle point when a five-level bridge arm is in a working mode 2.
Figure 15D:
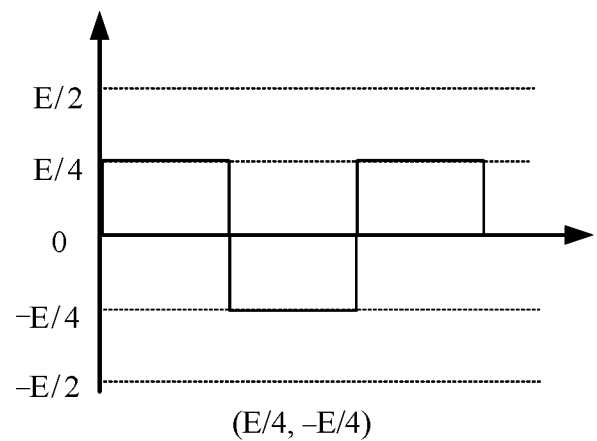
FIG. 15d is a schematic diagram of a square wave voltage signal output at a bridge arm middle point when another five-level bridge arm is in a working mode 2.

When 0.5≥M>0.25, or when an output voltage is greater than a third preset voltage and less than the second preset voltage, the LLC resonant converter circuit is controlled to work in the working mode 2. In the working mode 2, a waveform of a square wave voltage signal output by the multi-level inverter circuit is shown in FIG. 15c and FIG. 15d.

Figure 15E:
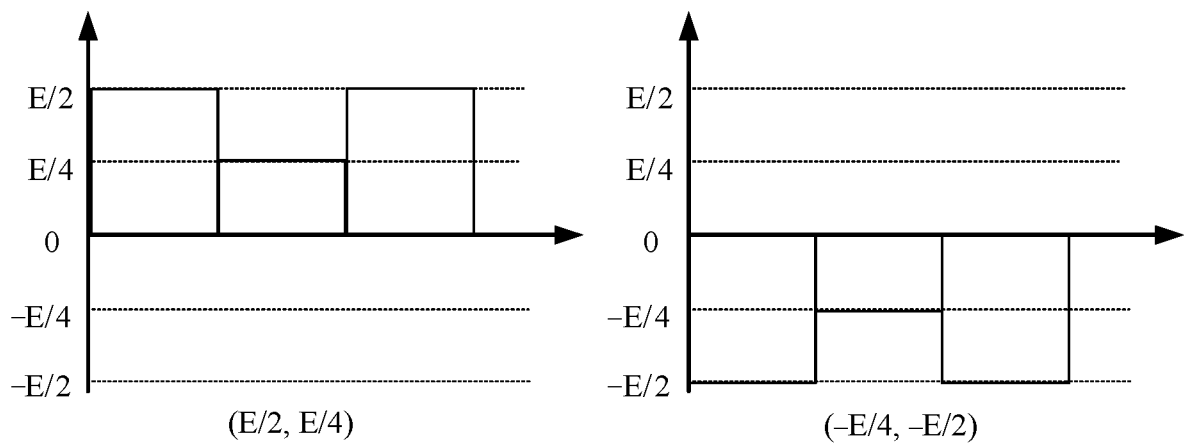
FIG. 15e is a schematic diagram of a square wave voltage signal output at a bridge arm middle point when a five-level bridge arm is in a working mode 4.
Figure 15F:
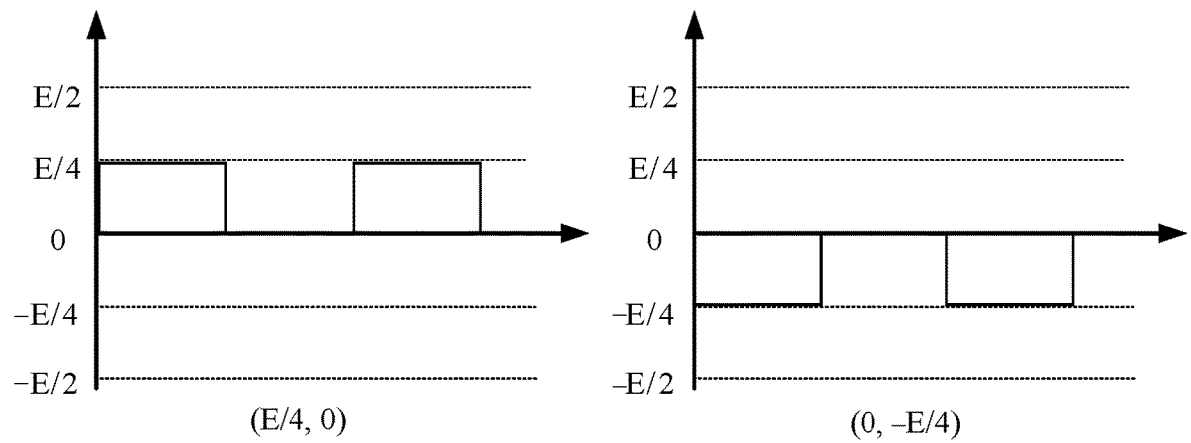
FIG. 15f is a schematic diagram of a square wave voltage signal output at a bridge arm middle point when another five-level bridge arm is in a working mode 4.

When M≤0.25, or when an output voltage is less than the third preset voltage, the LLC resonant converter circuit is controlled to work in the working mode 4. In the working mode 4, a waveform of a square wave voltage signal output by the multi-level inverter circuit is shown in FIG. 15e.

In the resonant converter circuit provided in this embodiment, a five-level converter circuit is placed before a resonant unit. When a required output voltage gain is relatively low, the five-level converter circuit may be controlled to reduce an input voltage to be input to the resonant unit. The five-level converter circuit can output four input voltages whose level differences are E, 3E/4, E/2, and E/4 respectively, to the resonant unit. The resonant converter circuit can work in different working modes respectively for four different output voltage requirements. Working mode control is more refined. This enables the resonant converter circuit to still work near its resonant frequency when the output voltage is lower, which in turn increases an output voltage range of the resonant converter circuit and its load capacity under low-voltage output.

In another aspect, in the foregoing resonant converter circuit embodiments, the three primary-side windings of the transformer assume a triangle connection style or a star connection style, and the three secondary-side windings may assume a triangle connection style or a star connection style. The triangle connection style means that three windings are connected in a head-to-tail manner to form a triangle, and three lead-out wires are led out from three connection points; and the start connection style means that tails of three windings are connected to form a common point, referred to as a neutral point, and three lead-out wires are led out from heads of the three windings respectively.

Figure 16A:
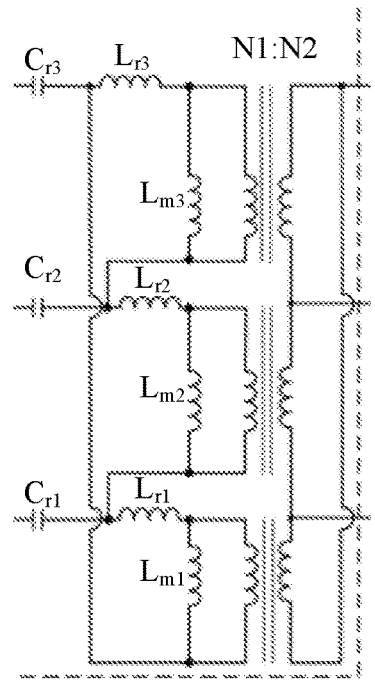
FIG. 16a is a schematic diagram of a connection between primary-side windings of a transformer and resonant units according to an embodiment of this application.

The resonant inductor, the resonant capacitor, and the primary-side windings of the transformer are connected in the following two manners:

(1) As shown in FIG. 16a, in a resonant unit, a resonant inductor Lr is leakage inductance of a transformer, an excitation inductor Lm is excitation inductance of the transformer, and primary-side windings of the transformer are connected to form a triangle.

In another embodiment of this application, a resonant inductor Lr is leakage inductance of a transformer, an excitation inductor Lm is excitation inductance of the transformer, and primary-side windings of the transformer are connected to form a star structure.

Figure 16B:
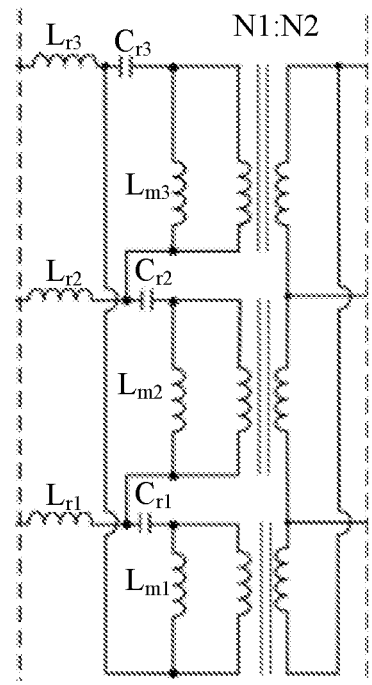
FIG. 16b is a schematic diagram of another connection between primary-side windings of a transformer and resonant units according to an embodiment of this application.

(2) As shown in FIG. 16b, a resonant capacitor Cr in a resonant unit and primary-side windings are connected in series, an excitation inductor Lm is excitation inductance of a transformer, Lr is a standalone inductor device, and the primary-side windings of the transformer are connected to form a triangle. In another embodiment of this application, the primary-side windings in FIG. 16b may alternatively be connected to form a star structure.

In still another aspect, when the resonant converter circuit provided in the embodiments of this application is applied in a three-phase circuit, a three-phase transformer may be implemented by connecting two transformers in series.

Figure 17:
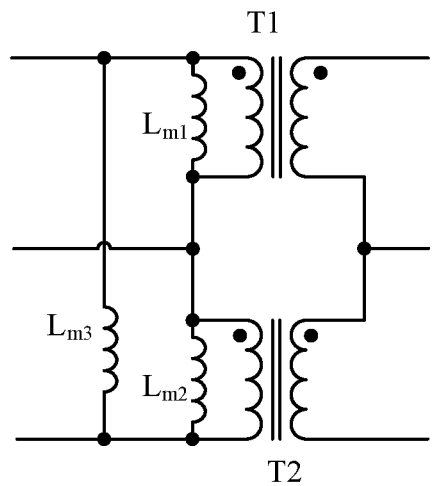
FIG. 17 is a schematic connection diagram of a transformer according to an embodiment of this application.

As shown in FIG. 17, a non-dotted terminal of a primary-side winding of a transformer T1 is connected to a dotted terminal of a primary-side winding of a transformer T2, and a resulting connection point is connected to an output terminal of a multi-level bridge arm; and a dotted terminal of the primary-side winding of T1 and a non-dotted terminal of the primary-side winding of T2 are connected to output terminals of the other two multi-level bridge arms respectively. A non-dotted terminal of a secondary-side winding of T1 is connected to a dotted terminal of a secondary-side winding of T2, and an obtained connection point is connected to an input terminal of a rectifier circuit; and a dotted terminal of the secondary-side winding of T1 and a non-dotted terminal of the secondary-side winding of T2 are connected to the other two input terminals of the rectifier circuit respectively.

In yet another aspect, in the foregoing resonant converter circuit embodiments, the rectifier circuit may be implemented by a rectifier half bridge that is implemented by MOS transistors. In this case, diodes in the rectifier circuit shown in FIG. 4 are replaced by MOS transistors. In addition, JFET transistors, GaN transistors, or IGBT transistors may also be used as substitutes for the diodes. Conduction losses of switching transistors such as MOS transistors, JFET transistors, GaN transistors, and IGBT transistors are less than conduction losses of diodes, and therefore a loss of the resonant converter circuit is further reduced.

In another application scenario, a relatively high power is needed, and one resonant converter circuit provided in the foregoing embodiments cannot meet the power requirement. In this case, a plurality of resonant converter circuits may be used and connected in series or parallel for implementation.

Figure 18A:
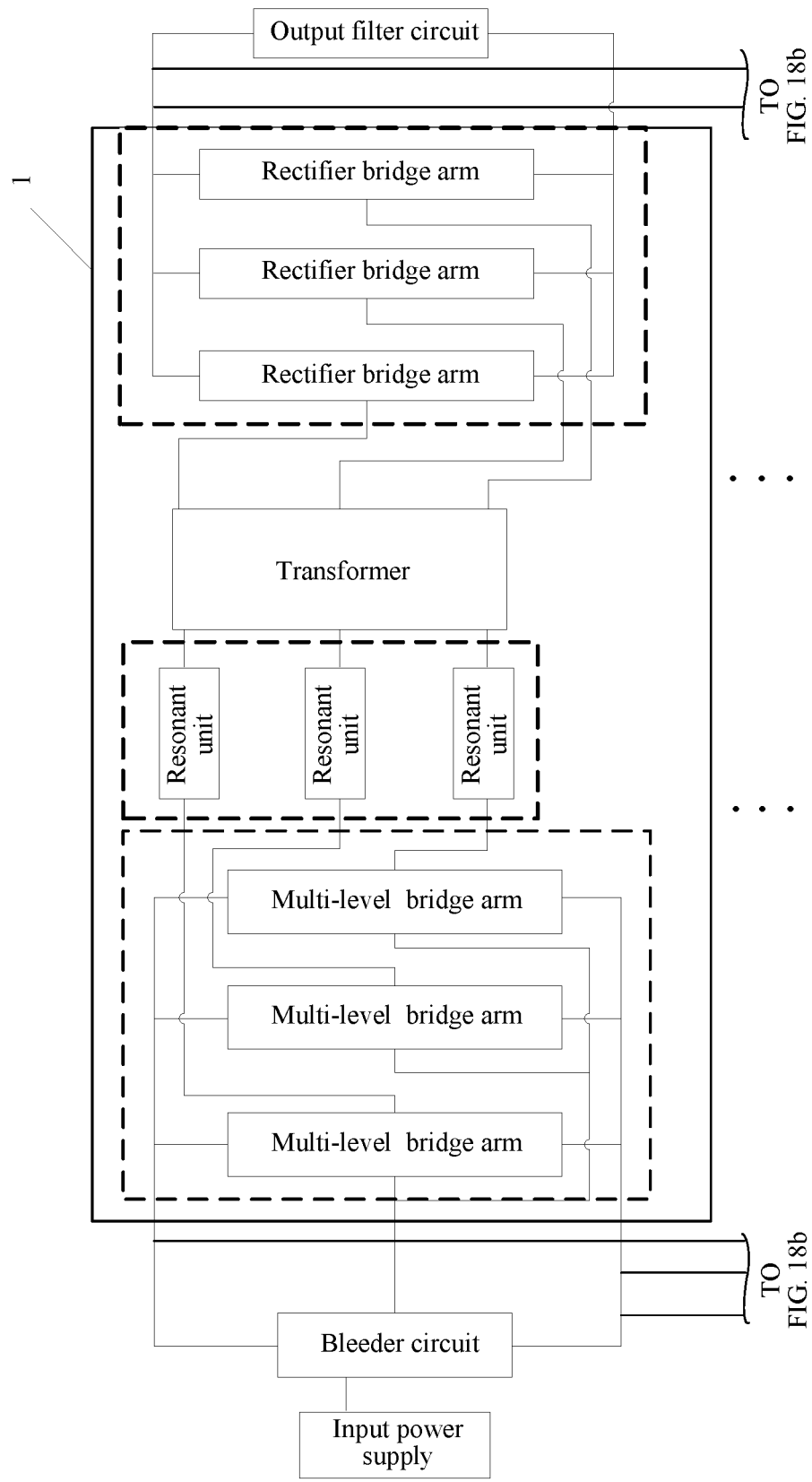
FIG. 18a and FIG. 18b are principle block diagrams of a power conversion system according to an embodiment of this application.
Figure 18B:
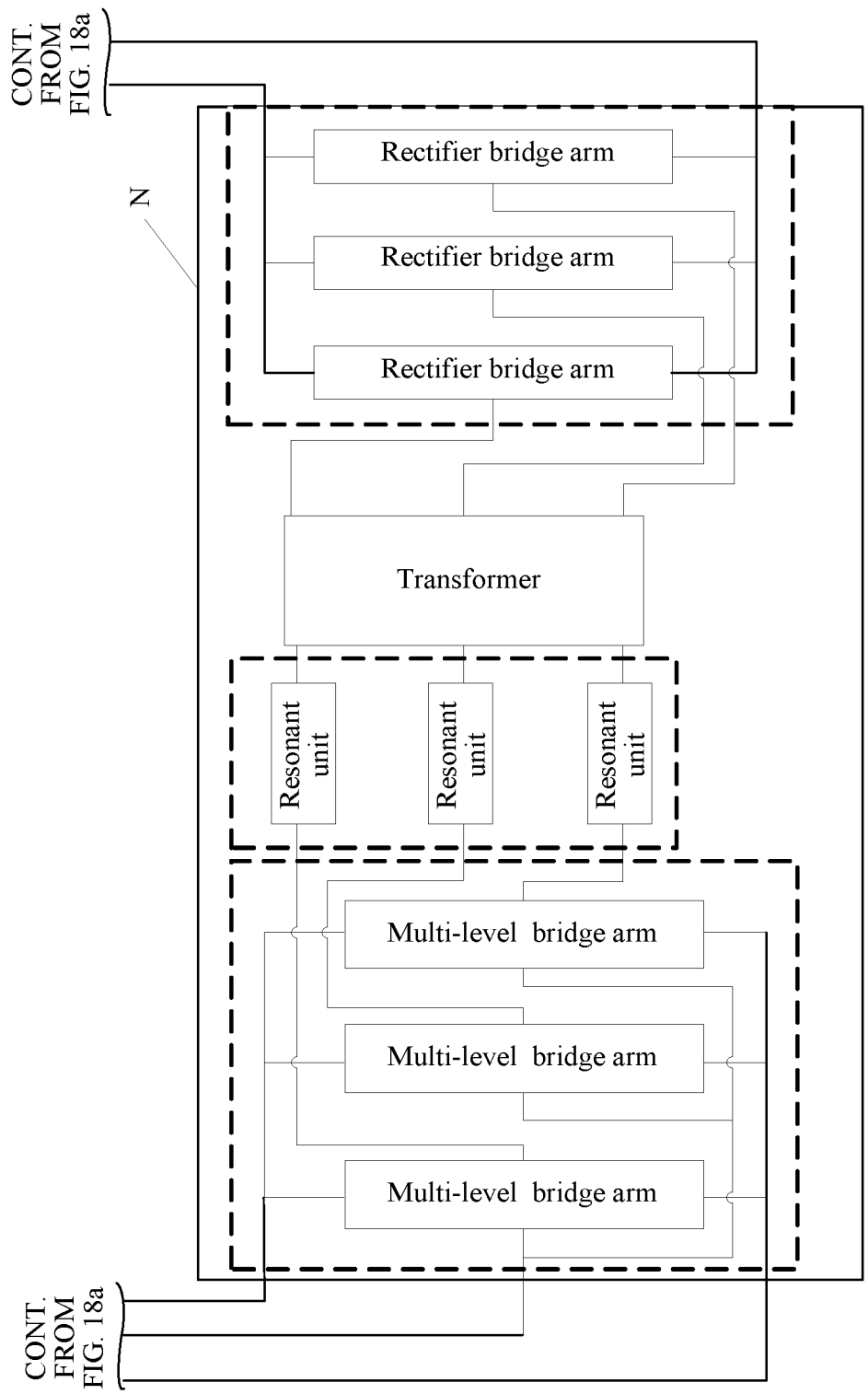

FIG. 18a and FIG. 18b is a principle block diagram of a power conversion system according to an embodiment of this application. The power conversion system includes N resonant converter circuits, where the N resonant converter circuits share one output filter circuit.

Input terminals of the resonant converter circuits are connected in parallel to two ends of an input power supply, and their output terminals may be connected in parallel or connected in series, or output terminals of some of the resonant converter circuits are connected in parallel and then the parallelly connected terminals are connected to output terminals of the other resonant converter circuits in series.

If the output terminals of the resonant converter circuits are connected in parallel, an output current of the entire system is equal to a sum of output currents of the resonant converter circuits. This is applicable to application scenarios characterized by low-voltage and high-current output. If the output terminals of the resonant converter circuits are connected in series, an output voltage of the entire system is equal to a sum of output voltages of the resonant converter circuits. This is applicable to application scenarios characterized by high-voltage and low-current output.

When the resonant converter circuits assume the circuit topology shown in FIG. 4, FIG. 8, or FIG. 9, these circuit topologies include a bleeder circuit, and the bleeder circuit is implemented by two bleeder capacitors. Therefore, a voltage balance needs to be achieved between the two bleeder capacitors.

In such application scenarios, when the resonant converter circuits work in the working mode 2, the different resonant converter circuits may be controlled to work in the manner A and the manner B respectively. For example, when N=2, one resonant converter circuit works in the manner A of the working mode 2, and the other resonant converter circuit works in the manner B of the working mode 2. In this way, a voltage balance is achieved between the two capacitors in the bleeder circuit, further enabling the entire power conversion system to work properly.

In still yet another aspect, this application further provides a resonant converter circuit control method. The method is applied in the foregoing resonant converter circuit embodiments or resonant converter circuit system embodiment. When a required output voltage of a resonant converter circuit is less than a preset voltage, switching statuses of switching transistors included in a multi-level inverter circuit is controlled to reduce a level difference of a square wave voltage signal output by the multi-level inverter circuit, so that the corresponding resonant converter circuit operates within a preset range of a resonant frequency.

In an embodiment of this application, if the multi-level inverter circuit is a three-level converter circuit, when the required output voltage is less than a first preset voltage, the three-level converter circuit is controlled to output a square wave voltage signal with a level difference of E/2, where E is a voltage of an input power supply; and when the required output voltage is greater than or equal to the first preset voltage, the three-level converter circuit is controlled to output a square wave voltage signal with a level difference of E.

In another embodiment of this application, if the multi-level inverter circuit is a five-level converter circuit, the preset voltage includes a second preset voltage, a third preset voltage, and a fourth preset voltage of which a latter one is greater than a former one, and the fourth preset voltage is less than a voltage E of an input power supply.

When the required output voltage is greater than or equal to the fourth preset voltage, the five-level converter circuit is controlled to output a square wave voltage signal with a level difference of E.

When the required output voltage is greater than or equal to the third preset voltage and less than the fourth preset voltage, the five-level converter circuit is controlled to output a square wave voltage signal with a level difference of 3E/4.

When the required output voltage is greater than or equal to the second preset voltage and less than the third preset voltage, the five-level converter circuit is controlled to output a square wave voltage signal with a level difference of E/2.

When the required output voltage is less than or equal to the second preset voltage, the five-level converter circuit is controlled to output a square wave voltage signal with a level difference of E/4.

In still another embodiment (the embodiment shown in FIG. 18a and FIG. 18b) of this application, there are two or more resonant converter circuits, the resonant converter circuits share one bleeder circuit that is connected in parallel to the two ends of the input power supply, and the bleeder circuit includes a first capacitor and a second capacitor that are connected in series.

When only the first capacitor (or the second capacitor) is needed to provide energy (for example, in the working mode 2), one half of the resonant converter circuits are controlled to work in a first preset mode in which only the first capacitor provides energy, and the other half of the resonant converter circuits are controlled to work in a second preset mode in which only the second capacitor provides energy, so that a voltage balance is achieved between the first capacitor and the second capacitor in the bleeder circuit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

It should be noted that the embodiments in this specification are described in a progressive manner, each embodiment focuses on its difference from other embodiments. For the same or similar parts in the embodiments, mutual reference may be made.

What is claimed is:

1. A resonant converter circuit, applied to a three-phase circuit, and comprising three multi-level inverter circuits, three resonant units, a three-phase transformer, a three-phase rectifier circuit, an output filter circuit, and a controller, wherein
   input terminals of the three multi-level inverter circuits are connected in parallel to two ends of an input power supply;
   input terminals of the three resonant units are connected to output terminals of the three multi-level inverter circuits respectively in a one-to-one mode, wherein the resonant units are configured to perform voltage conversion on square wave voltage signals;
   three primary-side windings of the three-phase transformer are connected to output terminals of the three resonant units respectively in a one-to-one mode, wherein the three-phase transformer is configured to perform voltage conversion on voltage signals output by the three resonant units;
   input terminals of the three-phase rectifier circuit are connected to secondary-side windings of the three-phase transformer respectively in a one-to-one mode, wherein the three-phase rectifier circuit is configured to rectify a voltage signal output by the transformer;
   an input terminal of the output filter circuit is connected to output terminals of the three-phase rectifier circuit, wherein the output filter circuit is configured to perform wave filtering on a voltage signal output by the three-phase rectifier circuit, to obtain an output voltage of the resonant converter circuit; and
   the controller is configured to, when a required output voltage is less than a preset voltage, control switching statuses of switching transistors in the multi-level inverter circuit to reduce an amplitude of a square wave voltage signal output by the multi-level inverter circuit, so that the resonant converter circuit operates within a preset range of a resonant frequency.

2. The resonant converter circuit according to claim 1, wherein the multi-level inverter circuit is a three-level converter circuit or a five-level converter circuit.

3. The resonant converter circuit according to claim 2, wherein the three-level converter circuit comprises a bleeder circuit and a first three-level bridge arm, wherein
   the bleeder circuit comprises a first capacitor and a second capacitor, wherein the first capacitor and the second capacitor are connected in series to the two ends of the input power supply, a connection point between the first capacitor and the second capacitor is a bleeder circuit middle point, and the bleeder circuit middle point is connected to a ground terminal;
   the first three-level bridge arm comprises a first switching transistor, a second switching transistor, a third switching transistor, and a fourth switching transistor;
   the first switching transistor and the second switching transistor are connected in co-directional series and then connected in parallel to two ends of the bleeder circuit, wherein a connection point between the first switching transistor and the second switching transistor is a bridge arm middle point of the T-shaped three-level bridge arm, and the bridge arm middle point is connected to the input terminal of the resonant unit as the output terminal of the multi-level inverter circuit; and
   the third switching transistor and the fourth switching transistor are connected in reverse series and then connected between the bleeder circuit middle point and the bridge arm middle point.

4. The resonant converter circuit according to claim 2, wherein the three-level converter circuit comprises a bleeder circuit and a second three-level bridge arm, wherein
   the bleeder circuit comprises a first capacitor and a second capacitor, wherein the first capacitor and the second capacitor are connected in series to the two ends of the input power supply, a connection point between the first capacitor and the second capacitor is a bleeder circuit middle point, and the bleeder circuit middle point is connected to a ground terminal;
   the second three-level bridge arm comprises a fifth switching transistor, a sixth switching transistor, a seventh switching transistor, and an eighth switching transistor that are sequentially connected in co-directional series, a first diode, and a second diode;
   a first terminal of the fifth switching transistor is connected to a positive terminal of the bleeder circuit, a second terminal of the eighth switching transistor is connected to a negative terminal of the bleeder circuit, and a connection point between the sixth switching transistor and the seventh switching transistor is a bridge arm middle point of the I-shaped three-level bridge arm;
   an anode of the first diode is connected to the bleeder circuit middle point, and a cathode of the first diode is connected to a connection point between the fifth switching transistor and the sixth switching transistor; and
   an anode of the second diode is connected to a connection point between the seventh switching transistor and the eighth switching transistor, and a cathode of the second diode is connected to the bleeder circuit middle point.

5. The resonant converter circuit according to claim 2, wherein the three-level converter circuit is a capacitor-clamped three-level bridge arm, wherein
   the capacitor-clamped three-level bridge arm comprises a ninth switching transistor, a tenth switching transistor, an eleventh switching transistor, a twelfth switching transistor, and a first clamping capacitor;
   the ninth switching transistor, the tenth switching transistor, the eleventh switching transistor, and the twelfth switching transistor are sequentially connected in co-directional series and then connected in parallel to the two ends of the input power supply; and
   a positive electrode of the first clamping capacitor is connected to a connection point between the ninth switching transistor and the tenth switching transistor, a negative electrode of the first clamping capacitor is connected to a connection point between the eleventh switching transistor and the twelfth switching transistor, and an end voltage of the first clamping capacitor is E/2, wherein E is a voltage of the input power supply.

6. The resonant converter circuit according to claim 2, wherein that the controller is configured to, when a required output voltage is less than a preset voltage, control switching statuses of switching transistors in the multi-level inverter circuit comprises:
  when the required output voltage is less than a first preset voltage, controlling the three-level converter circuit to output a square wave voltage signal with a level difference of E/2, wherein E is the voltage of the input power supply.

7. The resonant converter circuit according to claim 2, wherein the five-level converter circuit comprises a bleeder circuit and a first five-level bridge arm, wherein
  the bleeder circuit comprises a first capacitor and a second capacitor, wherein the first capacitor and the second capacitor are connected in series to the two ends of the input power supply, a connection point between the first capacitor and the second capacitor is a bleeder circuit middle point, and the bleeder circuit middle point is connected to a ground terminal;
  the first five-level bridge arm comprises a second clamping capacitor, a thirteenth switching transistor, a fourteenth switching transistor, a fifteenth switching transistor, a sixteenth switching transistor, a seventeenth switching transistor, an eighteenth switching transistor, a nineteenth switching transistor, and a twentieth switching transistor;
  the thirteenth switching transistor, the fourteenth switching transistor, the fifteenth switching transistor, and the sixteenth switching transistor are sequentially connected in co-directional series to obtain a vertical bridge, wherein the vertical bridge is connected in parallel to two ends of the bleeder circuit, and a connection point between the fourteenth switching transistor and the fifteenth switching transistor is a bridge arm middle point of the five-level bridge arm;
  the seventeenth switching transistor and the eighteenth switching transistor are connected in reverse series to obtain a first horizontal bridge, wherein the first horizontal bridge bridges the bleeder circuit middle point and a connection point between the thirteenth switching transistor and the fourteenth switching transistor;
  the nineteenth switching transistor and the twentieth switching transistor are connected in reverse series to obtain a second horizontal bridge, wherein the second horizontal bridge bridges the bleeder circuit middle point and a connection point between the fifteenth switching transistor and the sixteenth switching transistor; and
  the second clamping capacitor spans to connect two ends of the fourteenth switching transistor and the fifteenth switching transistor, and a voltage of the second clamping capacitor is E/4, wherein E is a voltage of the input power supply.

8. The resonant converter circuit according to claim 2, wherein the five-level converter circuit comprises a bleeder circuit and a second five-level bridge arm, wherein
  the bleeder circuit comprises a first capacitor and a second capacitor, wherein the first capacitor and the second capacitor are connected in series to the two ends of the input power supply, a connection point between the first capacitor and the second capacitor is a bleeder circuit middle point, and the bleeder circuit middle point is connected to a ground terminal;
  the second five-level bridge arm comprises a third clamping capacitor, a twenty-first switching transistor, a twenty-second switching transistor, a twenty-third switching transistor, a twenty-fourth switching transistor, a twenty-fifth switching transistor, a twenty-sixth switching transistor, a twenty-seventh switching transistor, and a twenty-eighth switching transistor;
  the twenty-first switching transistor, the twenty-second switching transistor, the twenty-third switching transistor, and the twenty-fourth switching transistor are sequentially connected in co-directional series and then connected in parallel to two ends of the bleeder circuit;
  the twenty-fifth switching transistor, the twenty-sixth switching transistor, the twenty-seventh switching transistor, and the twenty-eighth switching transistor are sequentially connected in co-directional series and then connected in parallel to two ends of the twenty-second switching transistor and the twenty-third switching transistor; and
  the third clamping capacitor bridges two ends of the twenty-sixth switching transistor and the twenty-seventh switching transistor, and a voltage of the third clamping capacitor is E/4, wherein E is a voltage of the input power supply.

9. The resonant converter circuit according to claim 2, wherein the preset voltage comprises a second preset voltage, a third preset voltage, and a fourth preset voltage of which a latter one is greater than a former one, and the fourth preset voltage is less than the voltage E of the input power supply; and
  that the controller is configured to, when a required output voltage is less than a preset voltage, control switching statuses of switching transistors in the multi-level inverter circuit comprises:
  when the required output voltage is greater than or equal to the third preset voltage and less than the fourth preset voltage, controlling the five-level converter circuit to output a square wave voltage signal with a level difference of 3E/4;
  when the required output voltage is greater than or equal to the second preset voltage and less than the third preset voltage, controlling the five-level converter circuit to output a square wave voltage signal with a level difference of E/2; and
  when the required output voltage is less than or equal to the second preset voltage, controlling the five-level converter circuit to output a square wave voltage signal with a level difference of E/4.

10. A resonant converter circuit system, comprising at least two resonant converter circuits according to claim 1, wherein the at least two resonant converter circuits share one output filter circuit and one controller, wherein
  input terminals of the at least two resonant converter circuits are connected in parallel to two ends of an input power supply; and
  output terminals of the at least two resonant converter circuits are connected in parallel or connected in series, or some of the output terminals are connected in parallel and the rest output terminals are connected in series.

11. The resonant converter circuit system according to claim 10, wherein the at least two resonant converter circuits share one bleeder circuit that is connected in parallel to the two ends of the input power supply, and the bleeder circuit comprises a first capacitor and a second capacitor that are connected in series; and
  when the resonant converter circuit system requires only the first capacitor or the second capacitor to provide energy, the controller is configured to:
  control one half of the resonant converter circuits to work in a first preset mode in which the first capacitor provides energy, and control the other half of the resonant converter circuits to work in a second preset mode in which the second capacitor provides energy.

12. A resonant converter circuit control method, applied to the resonant converter circuit according to claim 1, wherein the method comprises:

controlling, when a required output voltage is less than a preset voltage, switching statuses of switching transistors in a multi-level inverter circuit to reduce a level difference of a square wave voltage signal output by the multi-level inverter circuit, so that the resonant converter circuit operates within a preset range of a resonant frequency.

13. The method according to claim 12, wherein the multi-level inverter circuit is a three-level converter circuit; and the controlling, when a required output voltage is less than a preset voltage, of switching statuses of switching transistors in a multi-level inverter circuit to reduce a level difference of a square wave voltage signal output by the multi-level inverter circuit comprises:

controlling, when the required output voltage is less than a first preset voltage, the three-level converter circuit to output a square wave voltage signal with a level difference of E/2, wherein E is a voltage of an input power supply; and controlling, when the required output voltage is greater than or equal to a first preset voltage, the three-level converter circuit to output a square wave voltage signal with a level difference of E.

14. The method according to claim 12, wherein the multi-level inverter circuit is a five-level converter circuit, the preset voltage comprises a second preset voltage, a third preset voltage, and a fourth preset voltage of which a latter one is greater than a former one, and the fourth preset voltage is less than a voltage E of an input power supply; and the controlling, when a required output voltage is less than a preset voltage, of switching statuses of switching transistors in a multi-level inverter circuit to reduce a level difference of a square wave voltage signal output by the multi-level inverter circuit comprises:

controlling, when the required output voltage is greater than or equal to the fourth preset voltage, the five-level converter circuit to output a square wave voltage signal with a level difference of E;

controlling, when the required output voltage is greater than or equal to the third preset voltage and less than the fourth preset voltage, the five-level converter circuit to output a square wave voltage signal with a level difference of 3E/4;

controlling, when the required output voltage is greater than or equal to the second preset voltage and less than the third preset voltage, the five-level converter circuit to output a square wave voltage signal with a level difference of E/2; and controlling, when the required output voltage is less than or equal to the second preset voltage, the five-level converter circuit to output a square wave voltage signal with a level difference of E/4.

15. The method according to claim 12, wherein there are two or more resonant converter circuits, the resonant converter circuits share one bleeder circuit that is connected in parallel to two ends of an input power supply, and the bleeder circuit comprises a first capacitor and a second capacitor that are connected in series; and the controlling, when a required output voltage is less than a preset voltage, of switching statuses of switching transistors in a multi-level inverter circuit to reduce a level difference of a square wave voltage signal output by the multi-level inverter circuit comprises:

when only the first capacitor or the second capacitor is needed to provide energy, controlling one half of the resonant converter circuits to work in a first preset mode in which only the first capacitor provides energy, and controlling the other half of the resonant converter circuits to work in a second preset mode in which only the second capacitor provides energy.

* * * * *

UNITED STATES PATENT AND TRADEMARK OFFICE
CERTIFICATE OF CORRECTION

| | |
|---|---|
| PATENT NO. | : 10,978,957 B2 |
| APPLICATION NO. | : 16/904735 |
| DATED | : April 13, 2021 |
| INVENTOR(S) | : Yanzhong Zhang et al. |

It is certified that error appears in the above-identified patent and that said Letters Patent is hereby corrected as shown below:

On the Title Page

Item (56), in Column 2, under "Other Publications", Lines 2-3, delete "Oct. 27, 2013 (Oct. 27, 2013)," and insert -- Oct. 27, 2013, --.

Signed and Sealed this
Fifth Day of July, 2022

Katherine Kelly Vidal
*Director of the United States Patent and Trademark Office*